US012794818B2

(12) United States Patent
Ögren et al.

(10) Patent No.: US 12,794,818 B2
(45) Date of Patent: Nov. 10, 2026

(54) METHOD AND SYSTEM FOR EMULATING ADAPTIVE NETWORK TRAFFIC PACKET PATTERNS OF INTERACTIVE SERVICES FOR MEASURING USER EXPERIENCE

(71) Applicant: INFOVISTA SWEDEN AB, Skellefteå (SE)

(72) Inventors: Per Niclas Ögren, Ursviken (SE); Dimitar Minovski, Stockholm (SE); Irina Cotanis, Warrenton, VA (US); Per Gustaf Anders Johansson, Skellefteå (SE); Henrique Souza Rossi, Skellefteå (SE); Karan Mitra, Skellefteå (SE); Christer Åhlund, Skellefteå (SE)

(73) Assignee: INFOVISTA SWEDEN AB, Skellefteå (SE)

( * ) Notice: Subject to any disclaimer, the term of this patent is extended or adjusted under 35 U.S.C. 154(b) by 350 days.

(21) Appl. No.: 18/526,228

(22) Filed: Dec. 1, 2023

(65) Prior Publication Data

US 2024/0187348 A1 Jun. 6, 2024

Related U.S. Application Data

(60) Provisional application No. 63/437,333, filed on Jan. 5, 2023, provisional application No. 63/430,300, filed on Dec. 5, 2022.

(51) Int. Cl.
*H04L 47/25* (2022.01)
*H04L 47/283* (2022.01)

(52) U.S. Cl.
CPC ............ *H04L 47/25* (2013.01); *H04L 47/283* (2013.01)

(58) Field of Classification Search
None
See application file for complete search history.

(56) References Cited

U.S. PATENT DOCUMENTS

2015/0264104 A1* 9/2015 Dunne .................... H04L 47/24 709/224
2017/0272792 A1* 9/2017 Bachmutsky ...... H04N 21/4532
2017/0353389 A1* 12/2017 Moore ................ H04L 47/2433
2019/0222491 A1 7/2019 Tomkins et al.
2021/0051088 A1* 2/2021 Kovari .................... H04L 41/14
2022/0345386 A1 10/2022 Madanapalli et al.
(Continued)

OTHER PUBLICATIONS

ETSI Technical Report, "Speech and multimedia Transmission Quality (STQ); QoS parameters and test scenarios for assessing network capabilities in 5G performance measurements," 2020, European Telecommunications Standards Institute, 45 pp.
(Continued)

*Primary Examiner* — Andre Tacdiran
(74) *Attorney, Agent, or Firm* — Womble Bond Dickinson (US) LLP

(57) ABSTRACT

A method and a system for measuring user experience with interactive OTT services delivered over mobile networks. The method entails procedures to develop a model to measure user experience of an interactive OTT service, while the system represents a software tool that implements the model and a technique to measure user experience of an interactive OTT service. The method is applicable to any interactive OTT service, while the system is directed to a particular interactive OTT service—a cloud mobile gaming service.

29 Claims, 27 Drawing Sheets

Examples of interactive Over the Top (OTT) services.

(56) References Cited

U.S. PATENT DOCUMENTS

| | | | | |
|---|---|---|---|---|
| 2023/0027754 | A1* | 1/2023 | Kolar | H04L 45/02 |
| 2025/0220010 | A1* | 7/2025 | Arngren | H04L 67/59 |

OTHER PUBLICATIONS

Ogren et al., "Results of a cloud gaming interactive test within the context of mobile networks," 2022, Telecommunication Standardization Sector, SG12-C18R1, Study Group 12, 25 pp.
Extended European Search Report issued Mar. 27, 2024, in counterpart European Application No. 23214124.2.

* cited by examiner

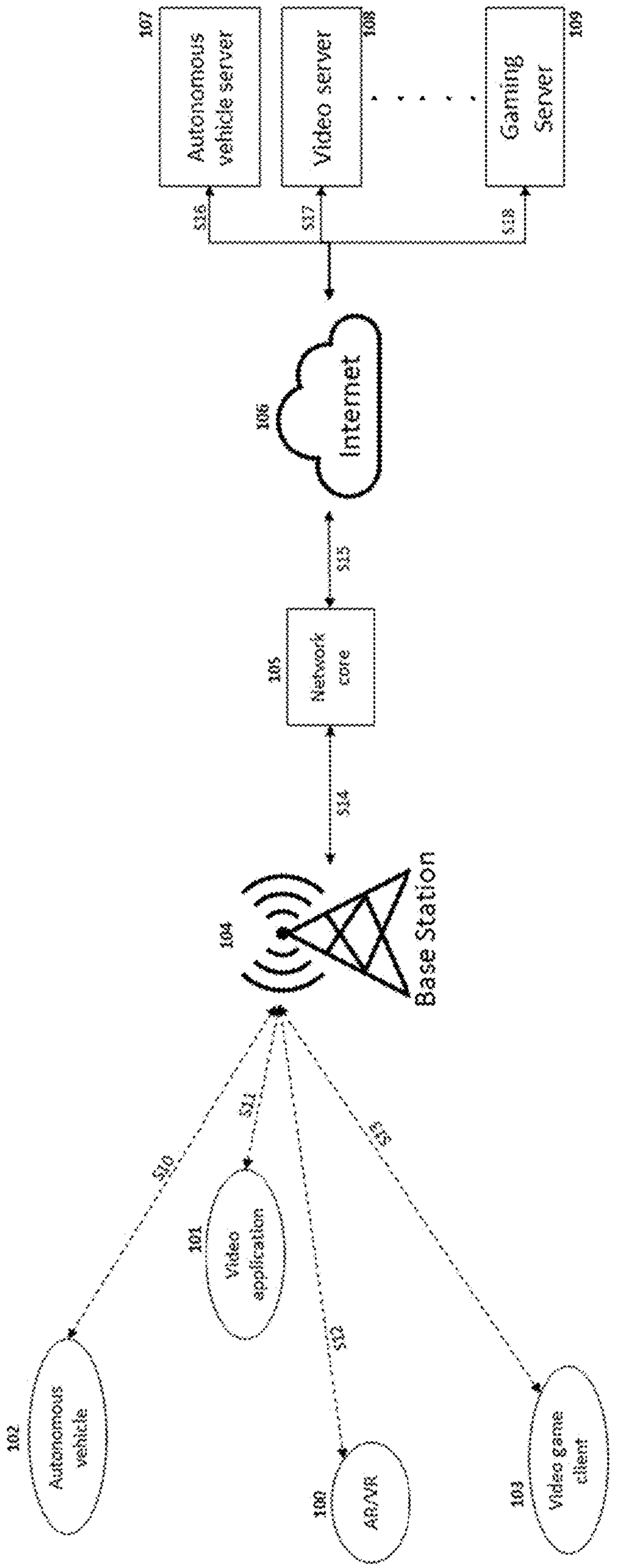
FIG 1. Examples of interactive Over the Top (OTT) services.

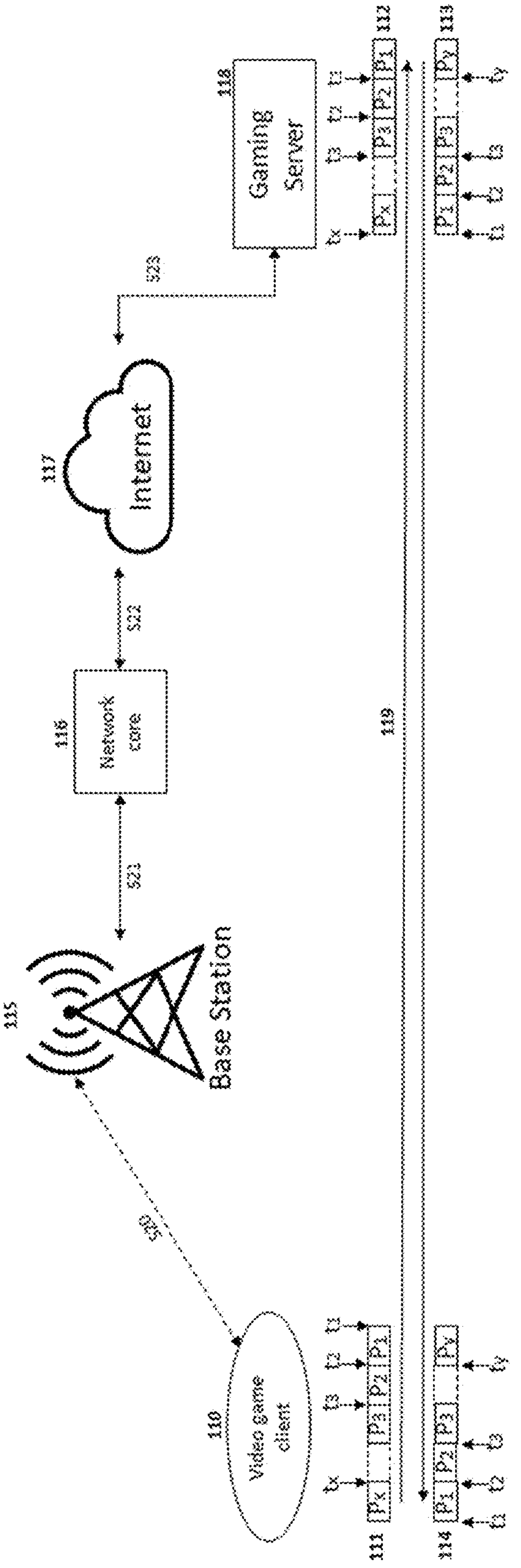
FIG. 2 Network packet exchange between a client and a software within an interactive OTT service.

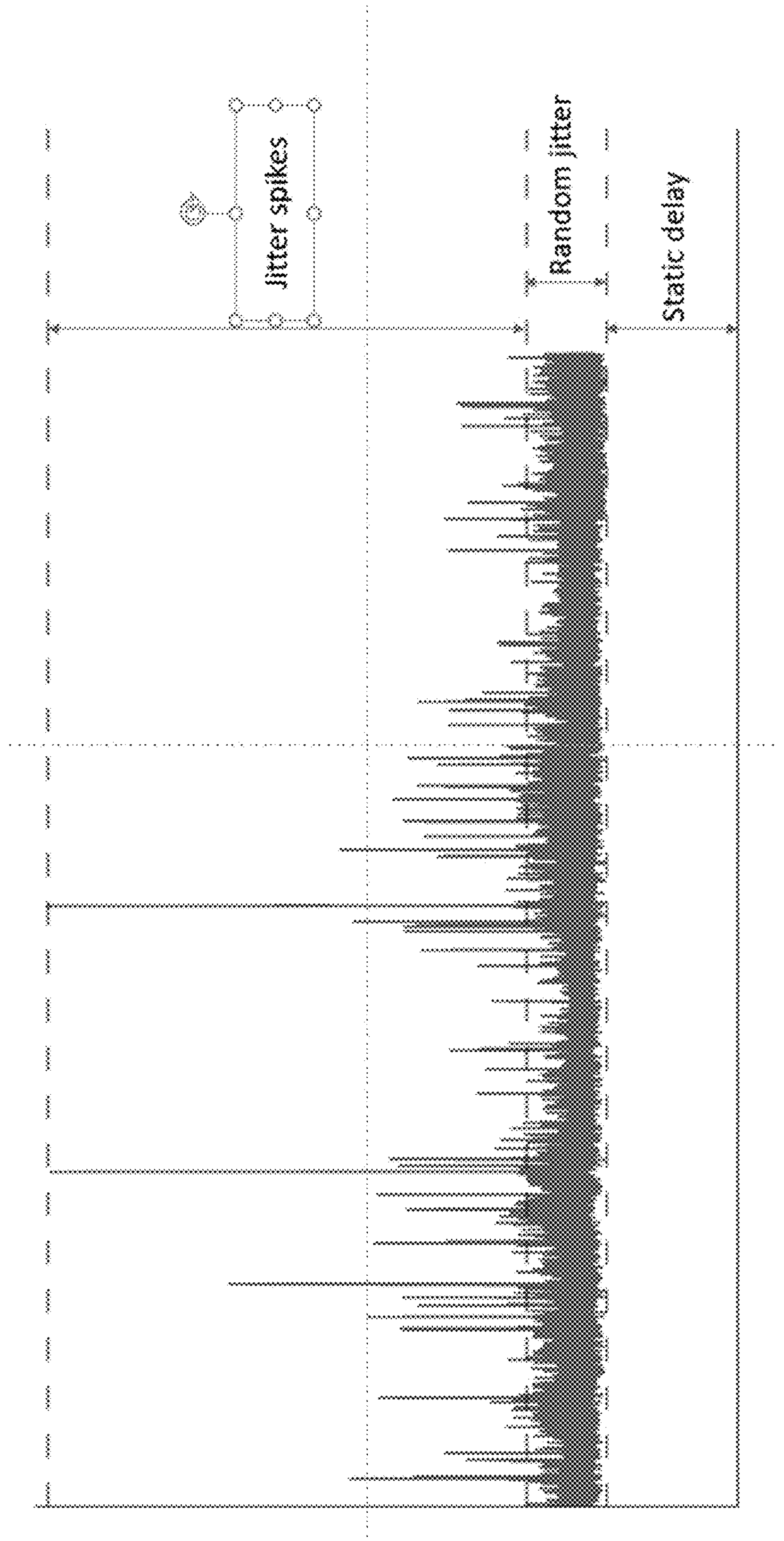
FIG. 3 Example measurement of the jitter

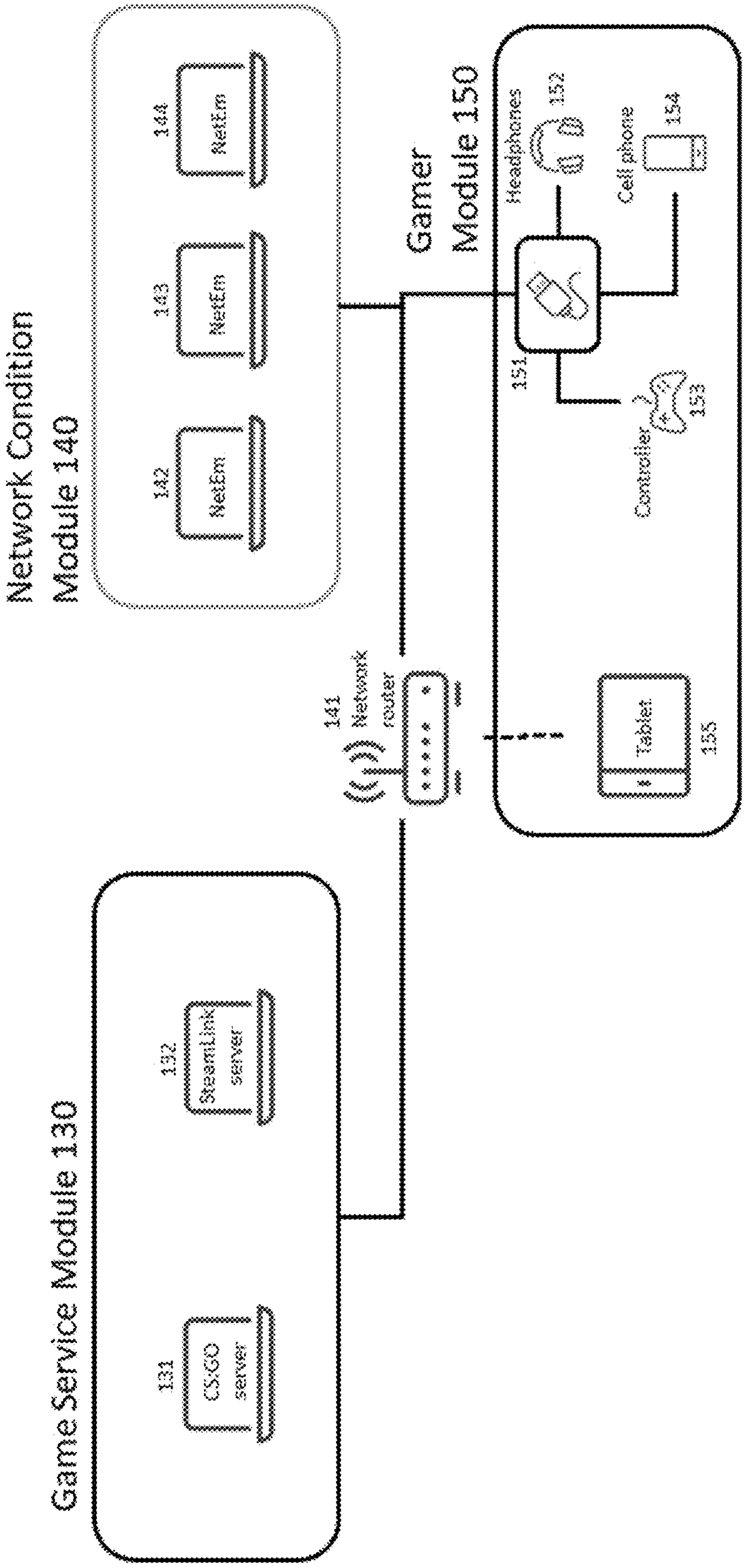
FIG. 4 Experimental setup

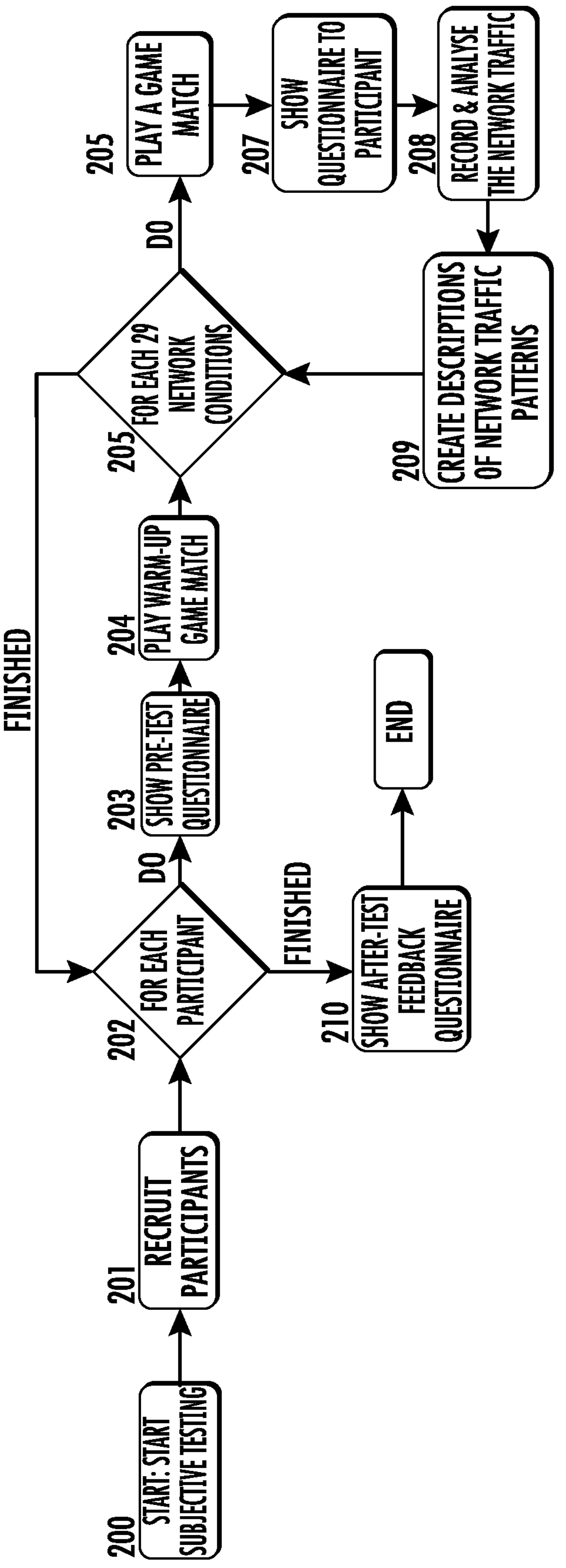
FIG. 5 FLOW OF THE EXPERIMENTS

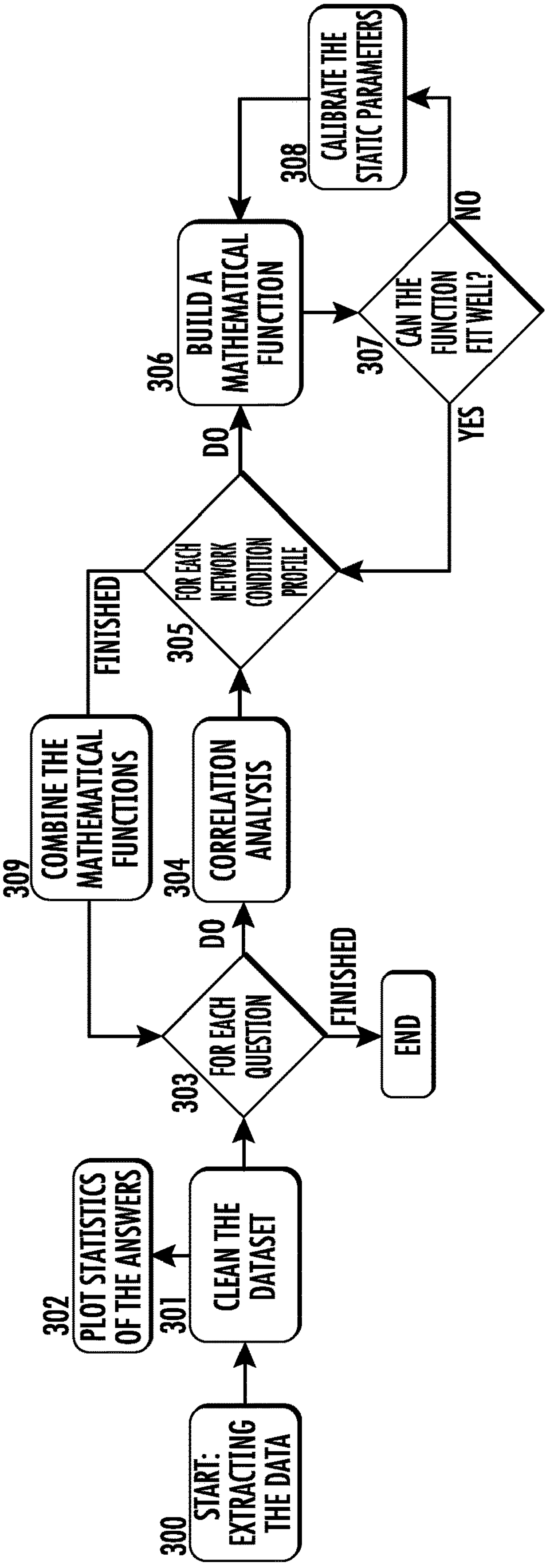
FIG. 6 RESEARCH FLOW FOR CREATING A UTILITY FUNCTION THAT MEASURES THE QUALITY OF EXPERIENCE

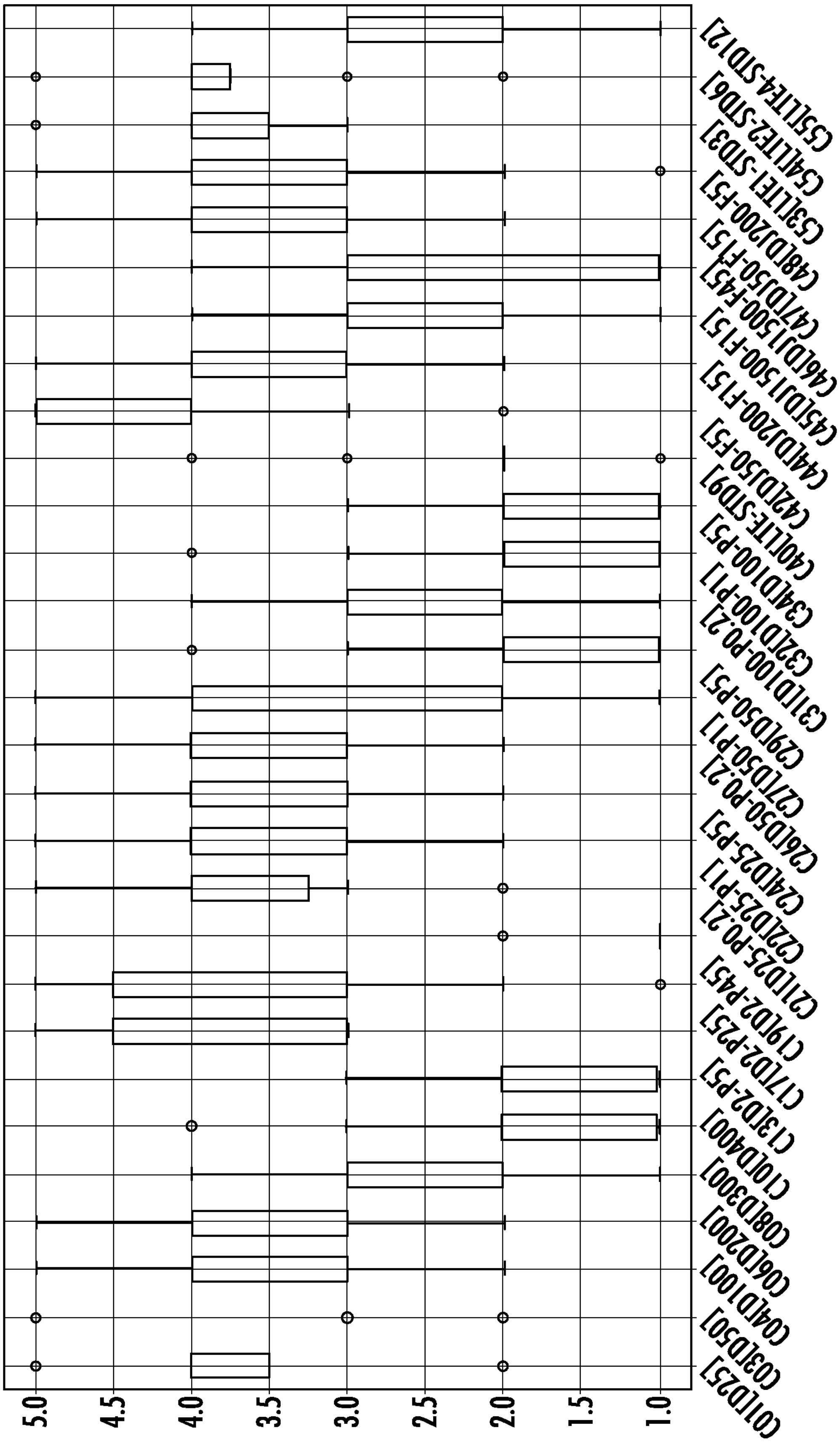
FIG. 7 STATISTICS OF THE RECORDED DATASET.

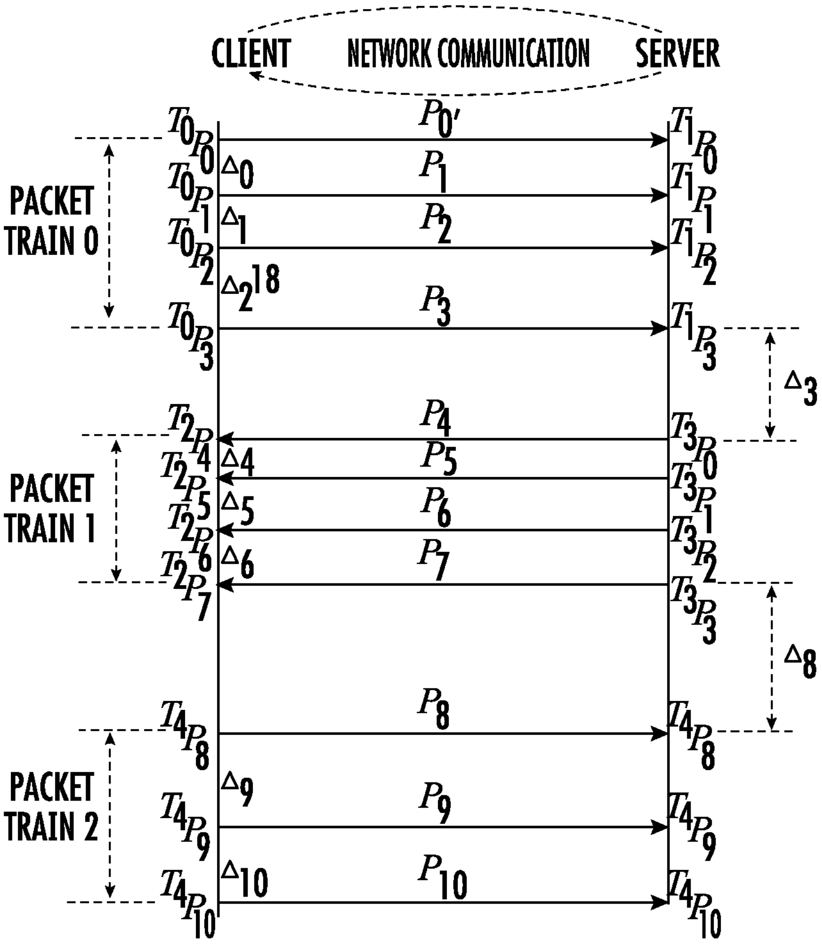
FIG. 8 CHARACTERISTICS OF NETWORK TRAFFIC PATTERNS.

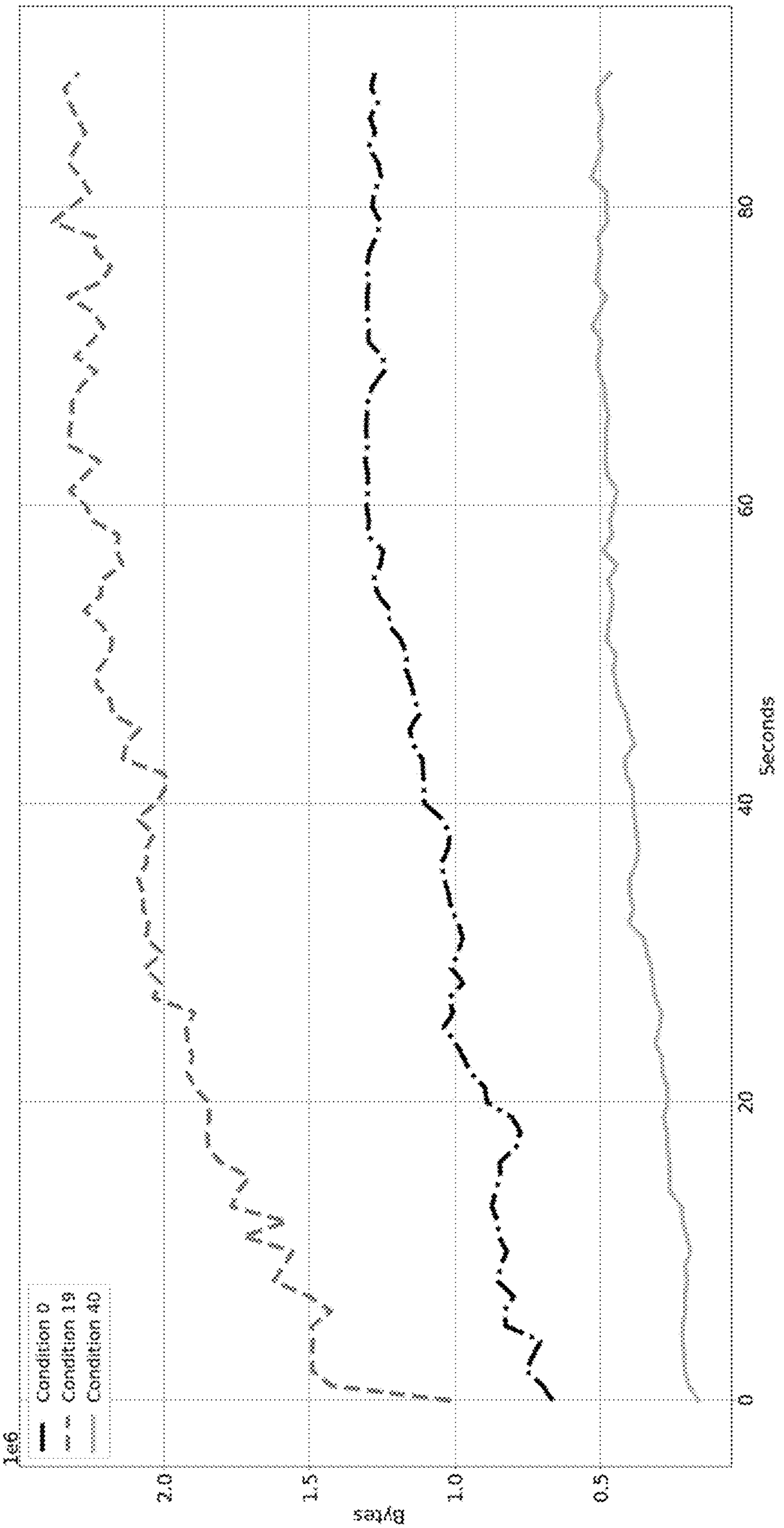
FIG. 9 Recorded gaming network traffic patterns for three network conditions

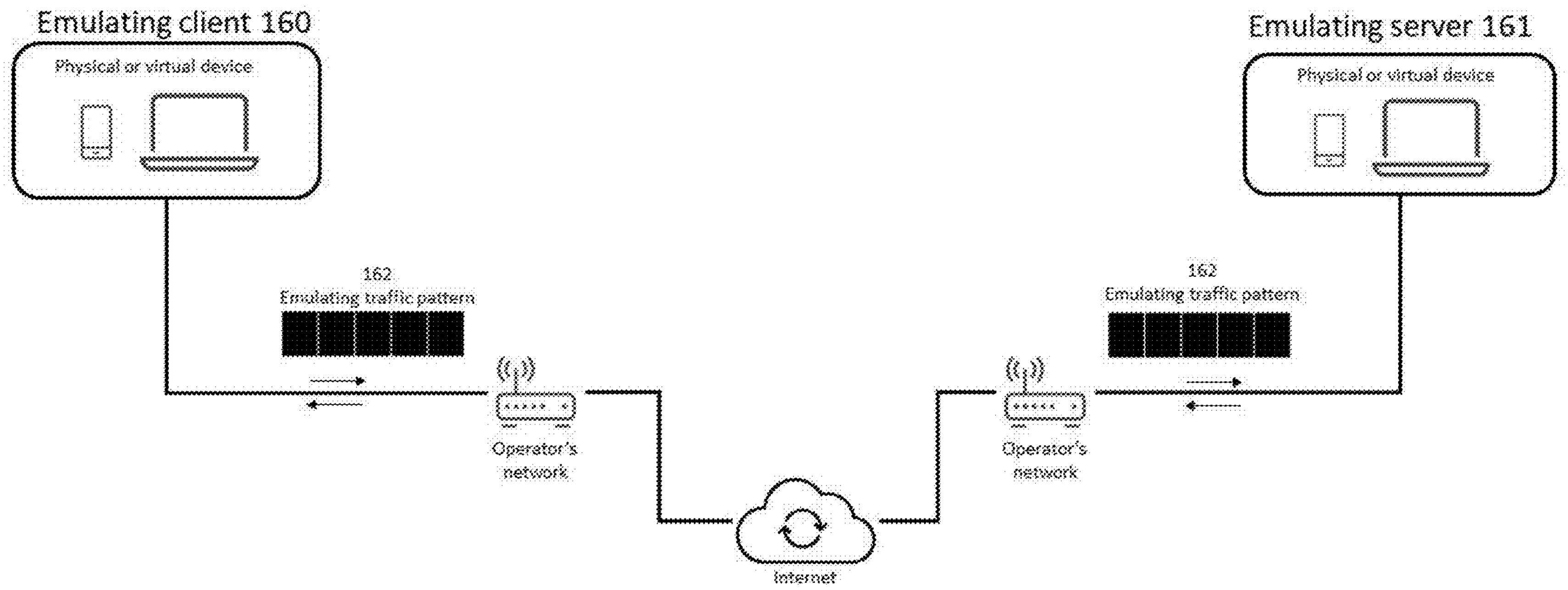
FIG. 10 Proposed system implementing the proposed method, emulates an interactive OTT service, dynamically adapts the traffic pattern, and estimates the user experience.

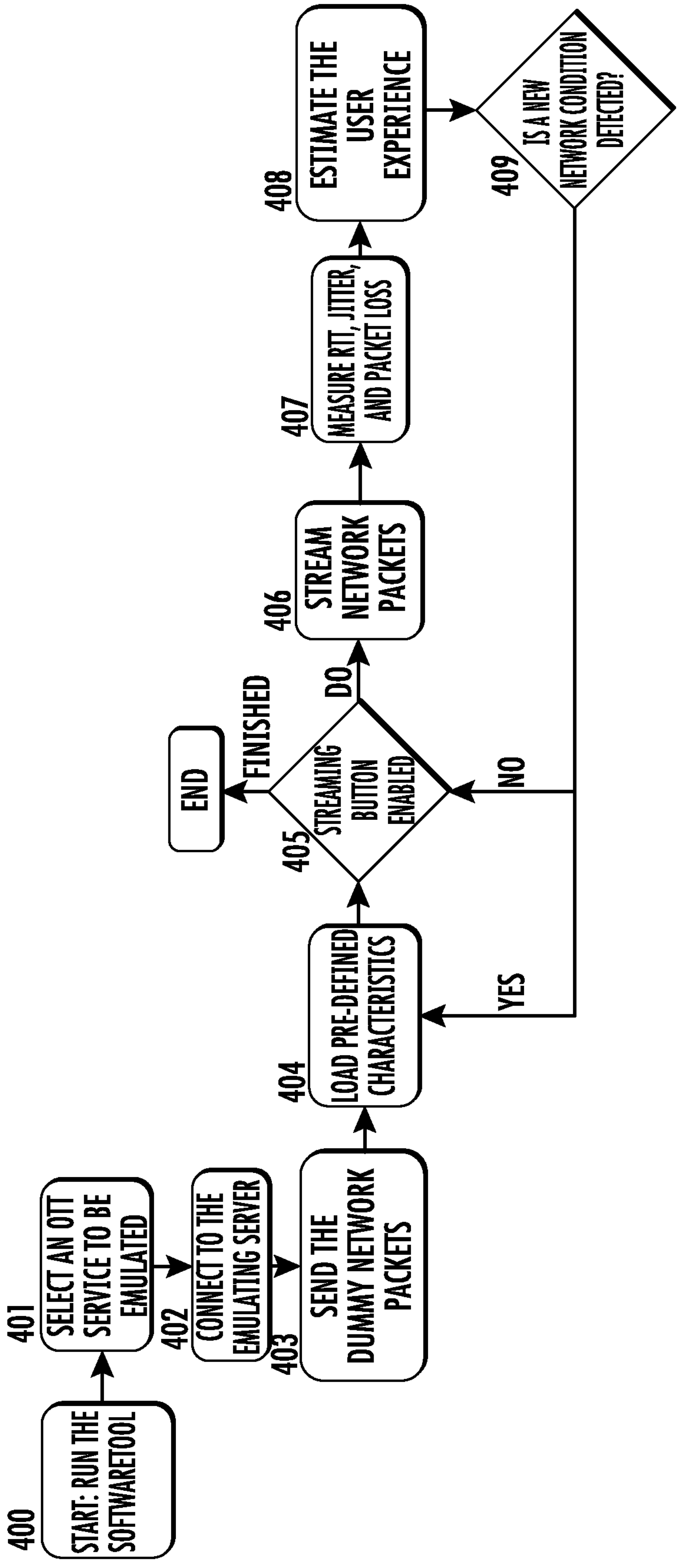
FIG. 11 A FLOW CHART OF A SOFTWARE TOOL FOR EMULATING NETWORK TRAFFIC PATTERN OF AN INTERACTIVE OTT SERVICE, IN A NETWORK COMMUNICATION BETWEEN A CLIENT AND A SERVER. THE CLIENT INITIATES AND ADAPTS THE NETWORK TRAFFIC PATTERN TO BE EMULATED, WHILE THE SERVER ONLY REFLECTS THE REQUESTED NETWORK TRAFFIC PATTERN BACK TO THE CLIENT

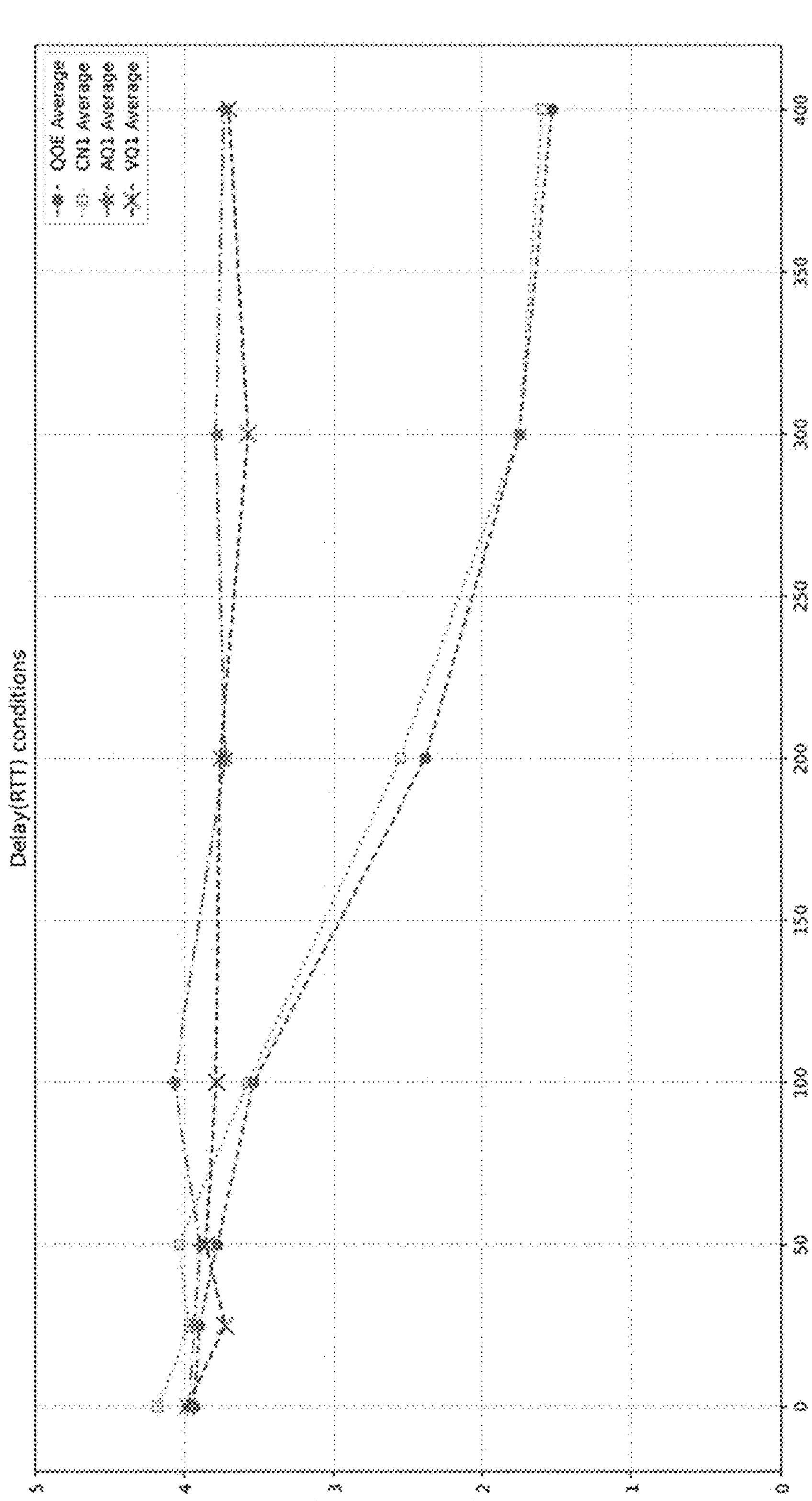
FIG. 12 Illustrating the RTT impact on the four different quality dimensions (QoE, CN1, VQ1, AQ1). The symbols represent the average score (1 to 5) from the participants for the respective questions

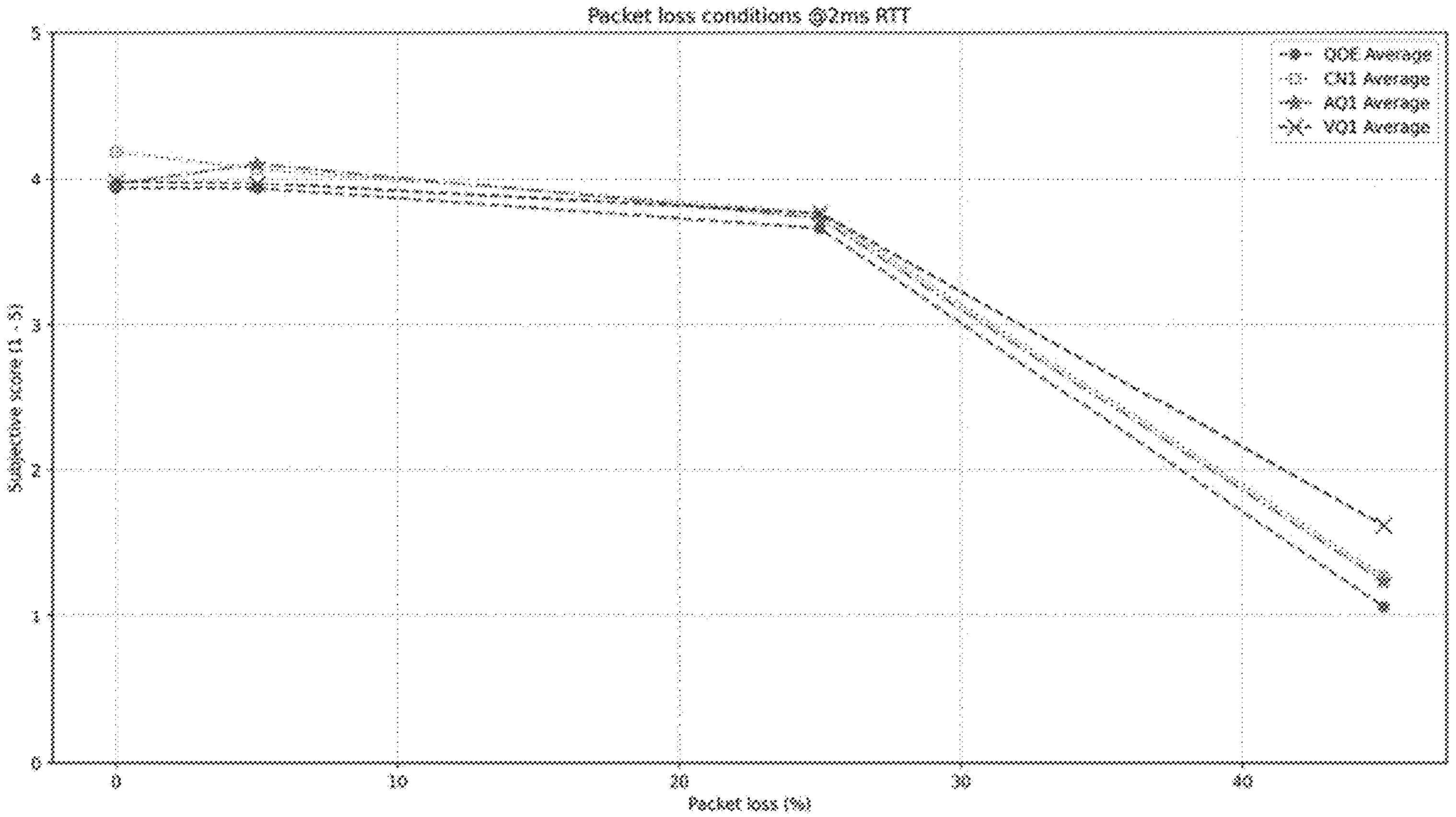
FIG. 13 Illustrating the PL impact on the four different quality dimensions (QoE, CN1, VQ1, AQ1), while RTT is 2ms constant. The symbols represent the average MOS score (1 to 5) from the participants for the respective questions

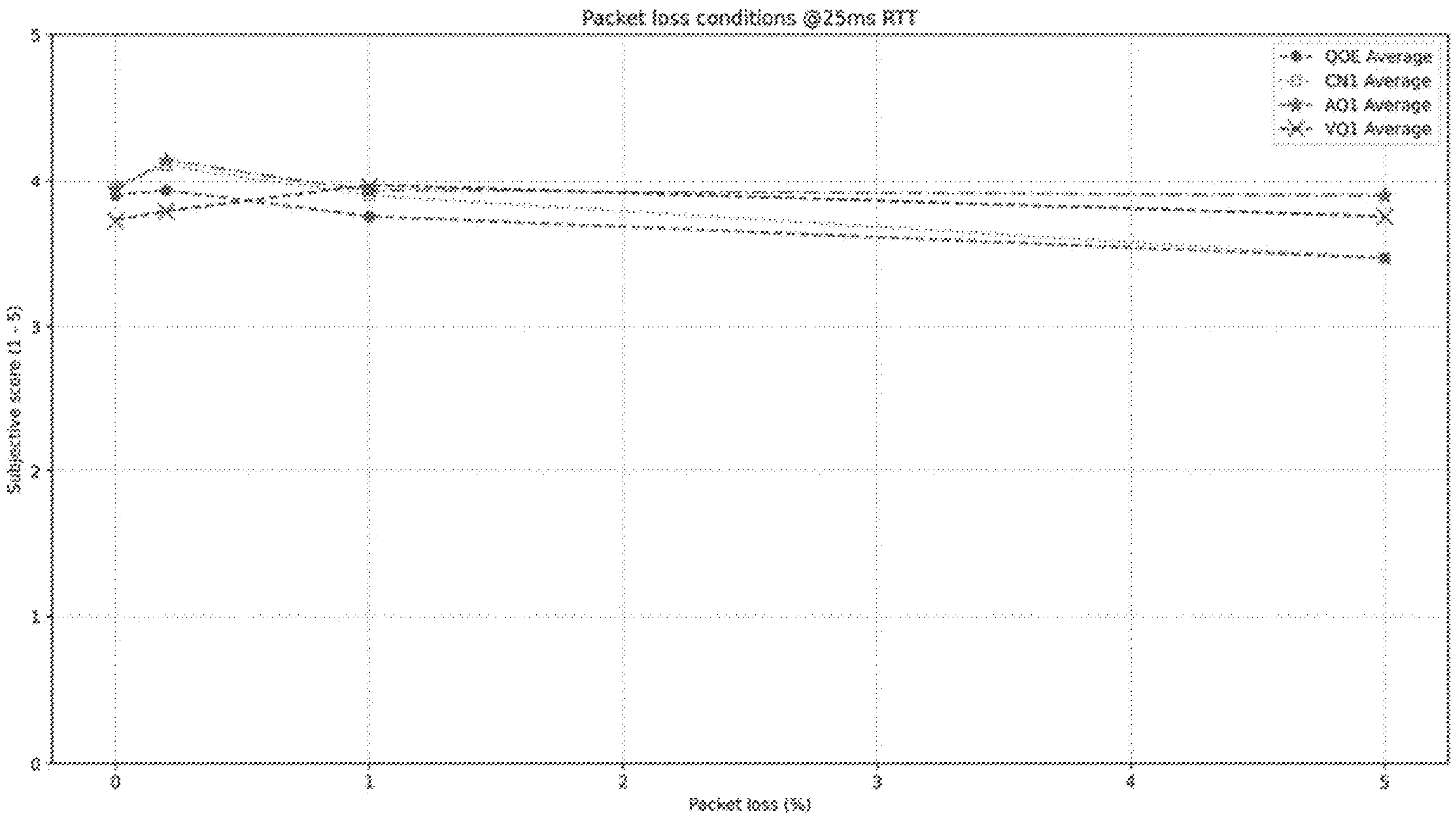
FIG. 14 Illustrating the PL impact on the four different quality dimensions (QoE, CN1, VQ1, AQ1), when RTT is 25ms constant. The symbols represent the average MOS score (1 to 5) from the participants for the respective questions

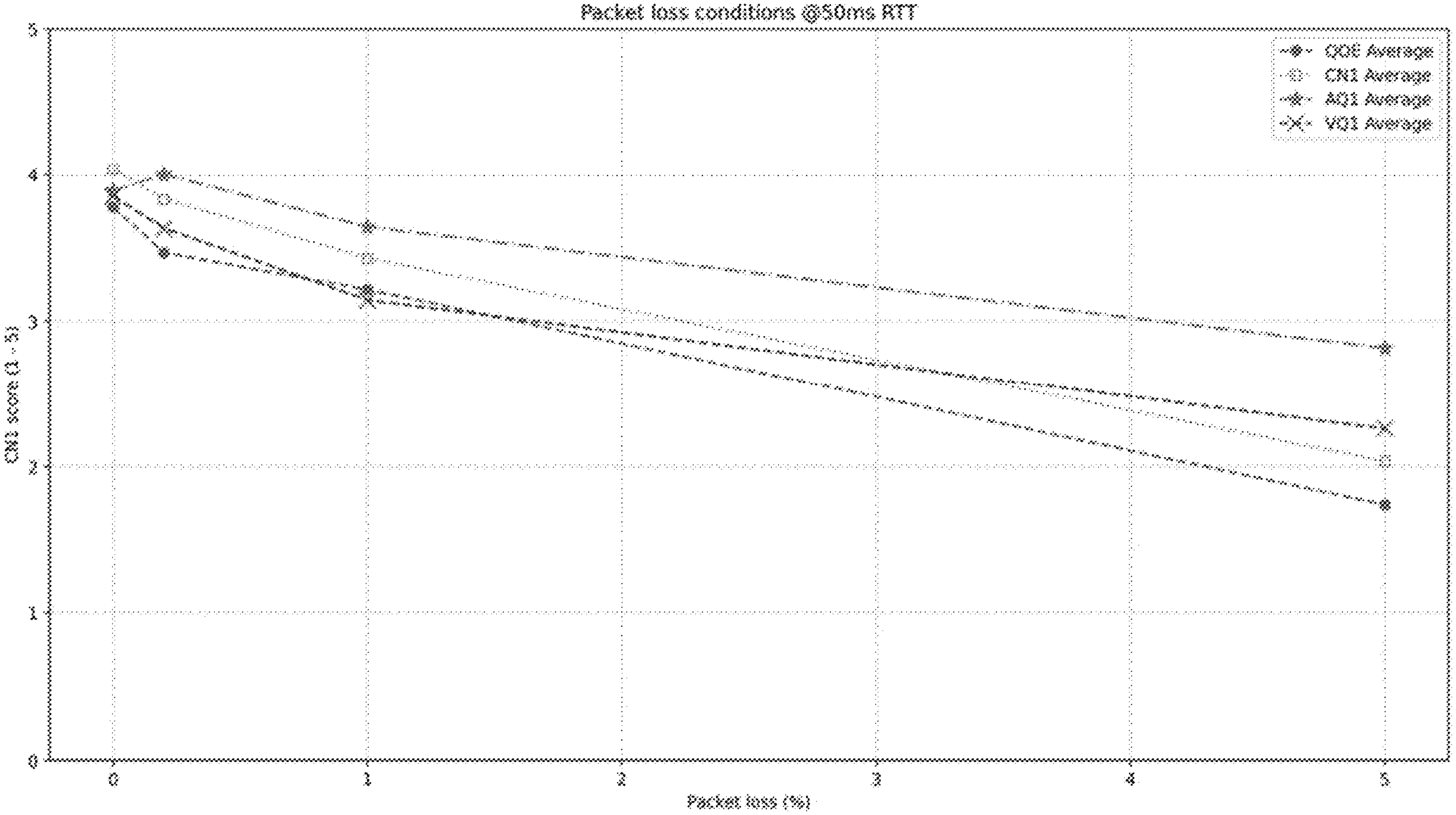
FIG. 15 Illustrating the PL impact on the four different quality dimensions (QoE, CN1, VQ1, AQ1), when RTT is 50ms constant. The symbols represent the average MOS score (1 to 5) from the participants for the respective questions

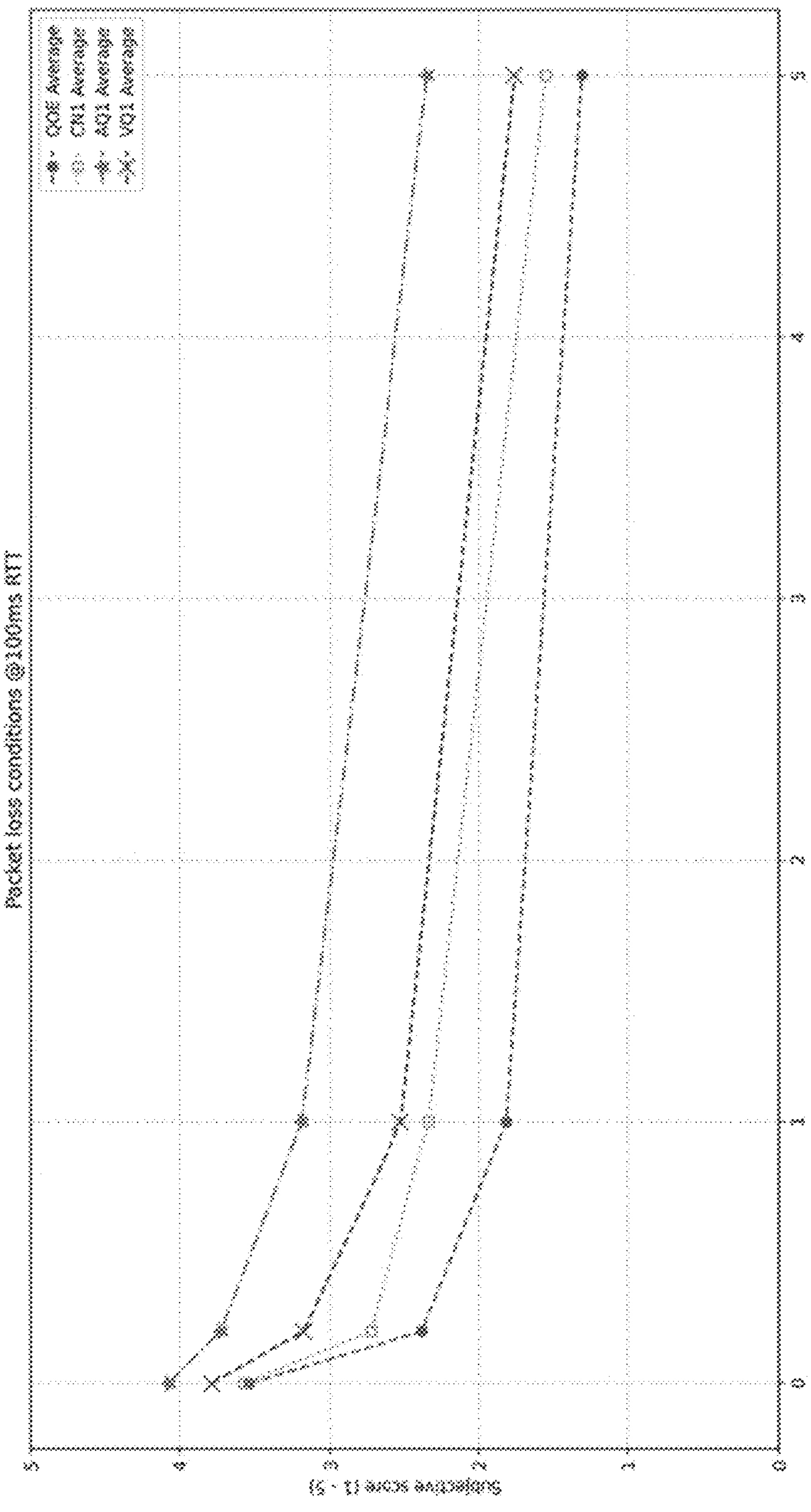
FIG. 16 Illustrating the PL impact on the four different quality dimensions (QoE, CN1, VQI, AQ1), when RTT is 100ms constant. The symbols represent the average MOS score (1 to 5) from the participants for the respective questions

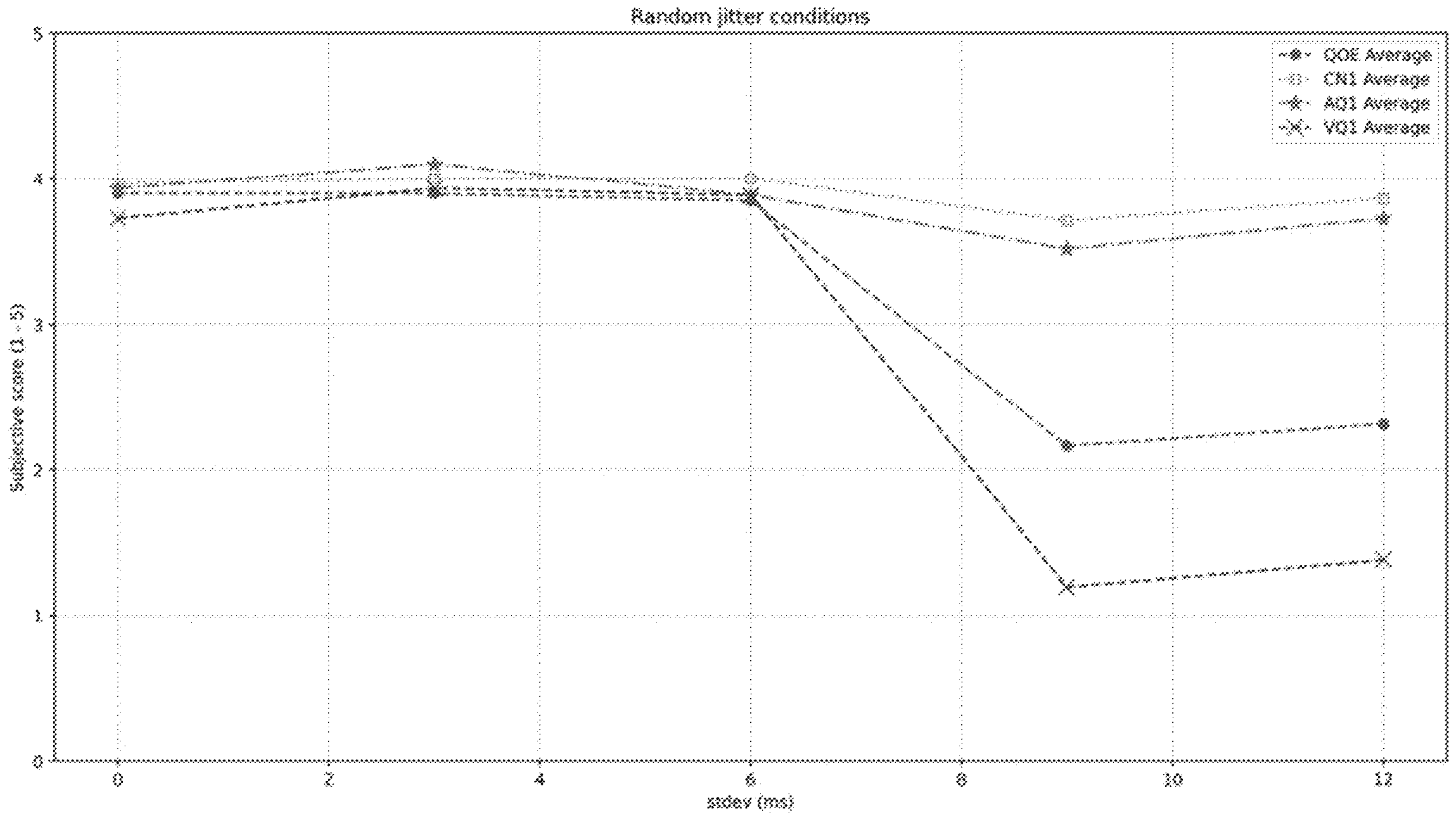
FIG. 17 Illustrating the Random Jitter impact on the four different quality dimensions (QoE, CN1, VQ1, AQ1). The symbols represent the average MOS score (1 to 5) from the participants for the respective questions.

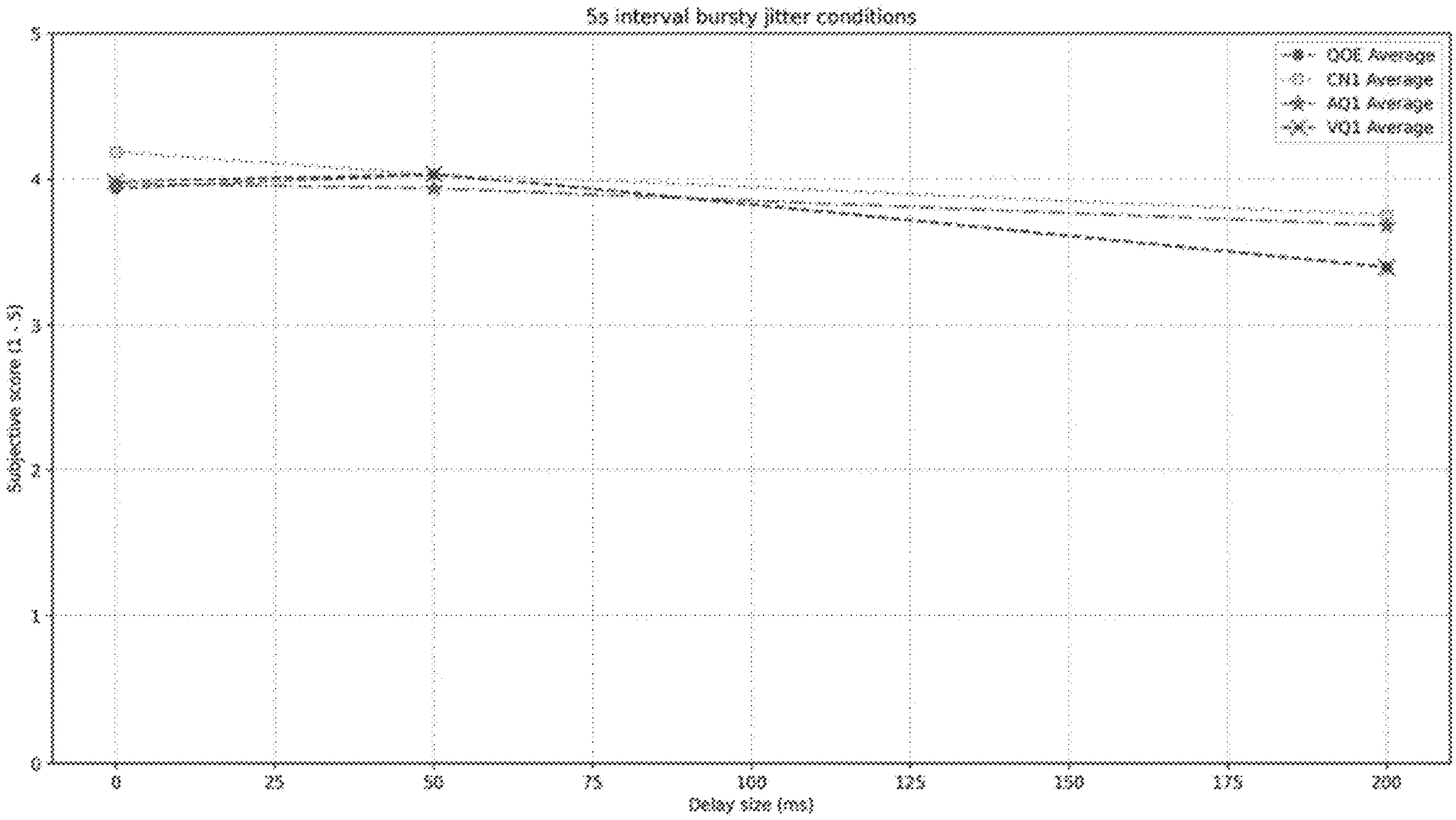
FIG. 18 Illustrating the Jitter spikes impact on the four different quality dimensions (QoE, CN1, VQ1, AQ1), when the frequency interval is 5seconds. The symbols represent the average MOS score (1 to 5) from the participants for the respective questions

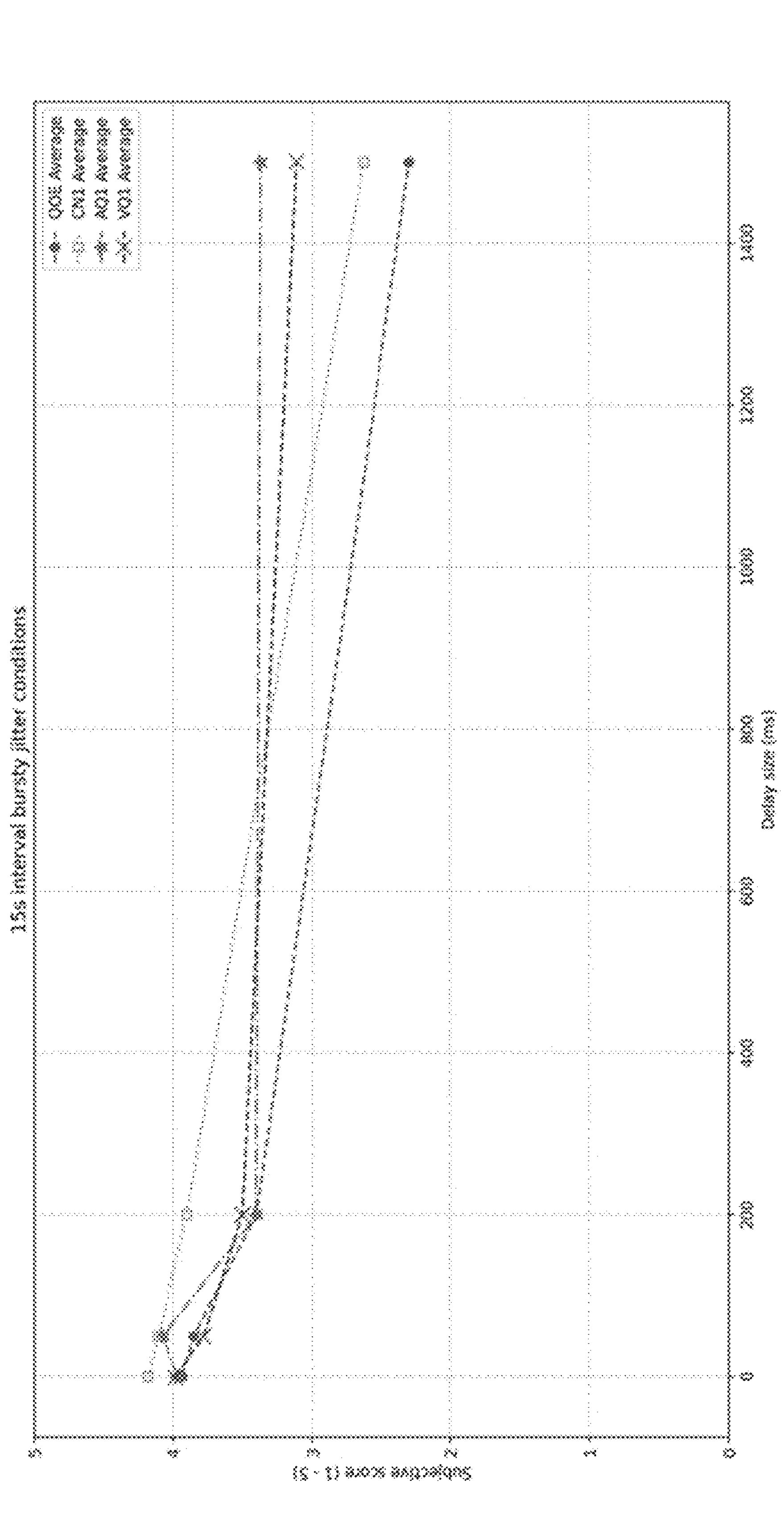
FIG. 19 Illustrating the Jitter spikes impact on the four different quality dimensions (QoE, CN1, VQ1, AQ1), when the frequency interval is 15seconds. The symbols represent the average MOS score (1 to 5) from the participants for the respective questions

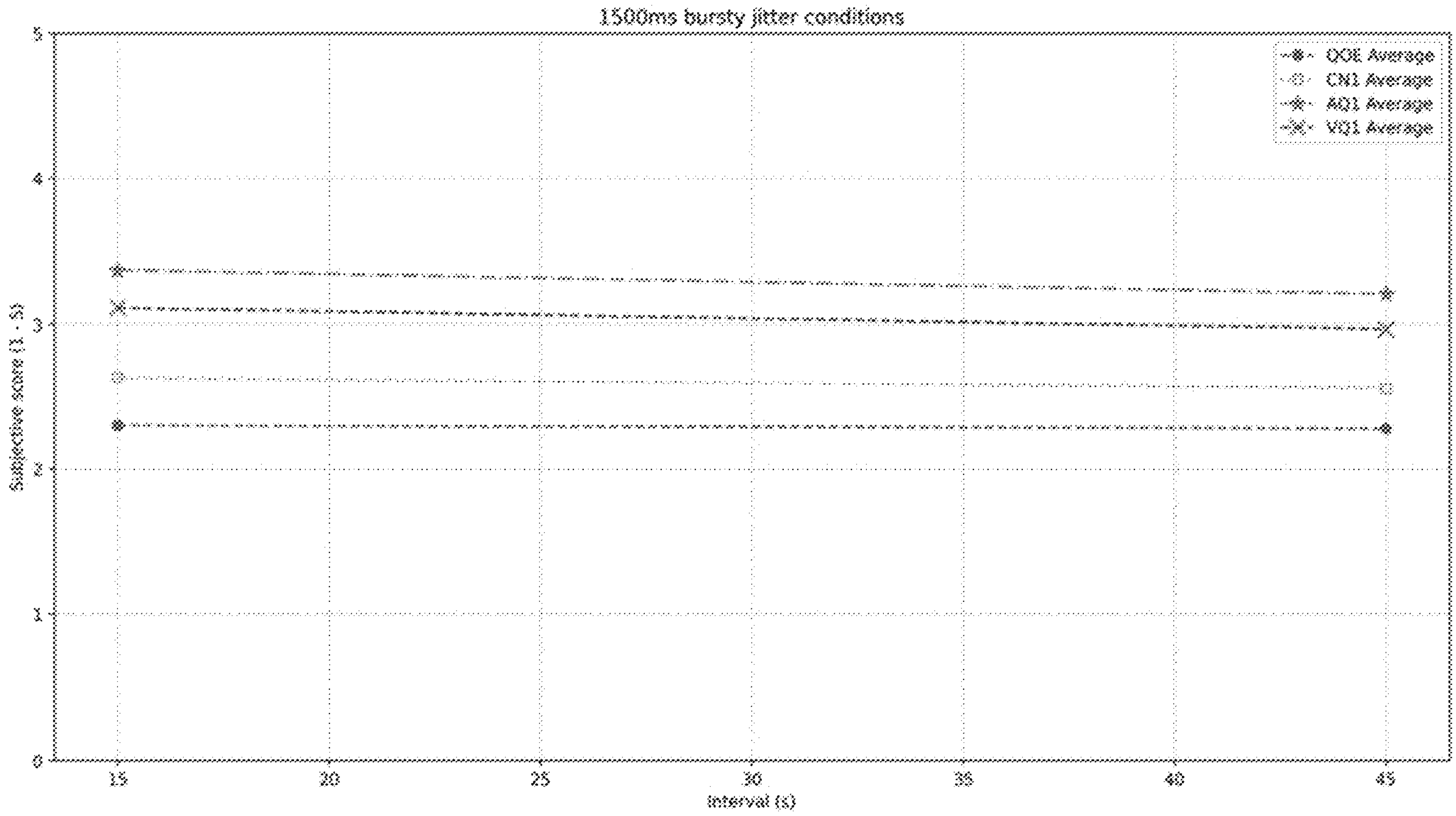
FIG. 20 Illustrating the Jitter spikes of 1500ms impact on the four different quality dimensions (QoE, CN1, VQ1, AQ1), when the frequency interval is either 15 or 45 seconds. The symbols represent the average MOS score (1 to 5) from the participants for the respective questions

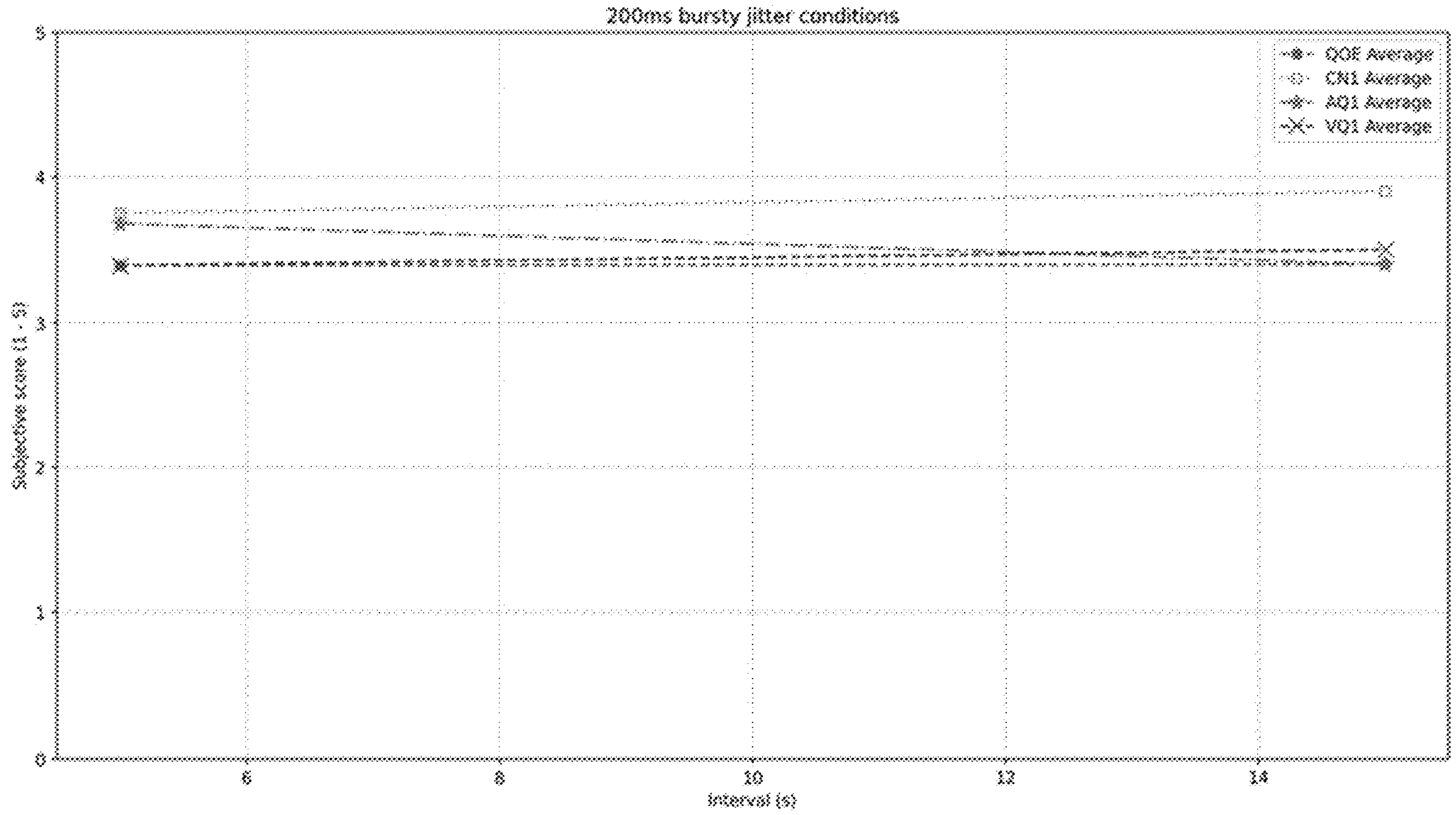
FIG. 21 Illustrating the Jitter spikes of 200ms impact on the four different quality dimensions (QoE, CN1, VQ1, AQ1), when the frequency interval is either 5 or 15 seconds. The symbols represent the average MOS score (1 to 5) from the participants for the respective questions

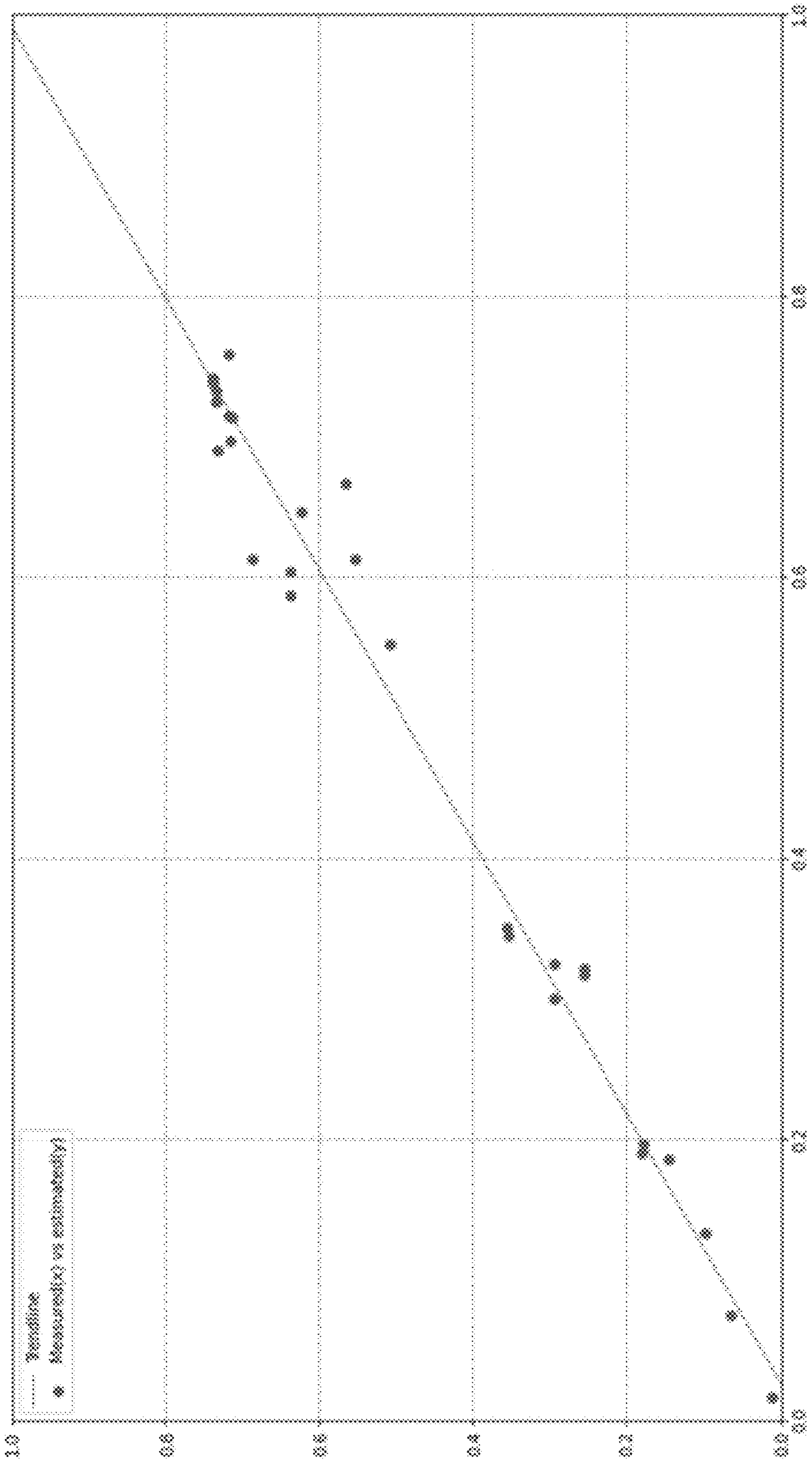
FIG. 22 A scatter plot of the estimated MOS using the proposed mathematical formula (3). The x-axis represents the measures subjective scores, while the y-axis represents the estimated scores

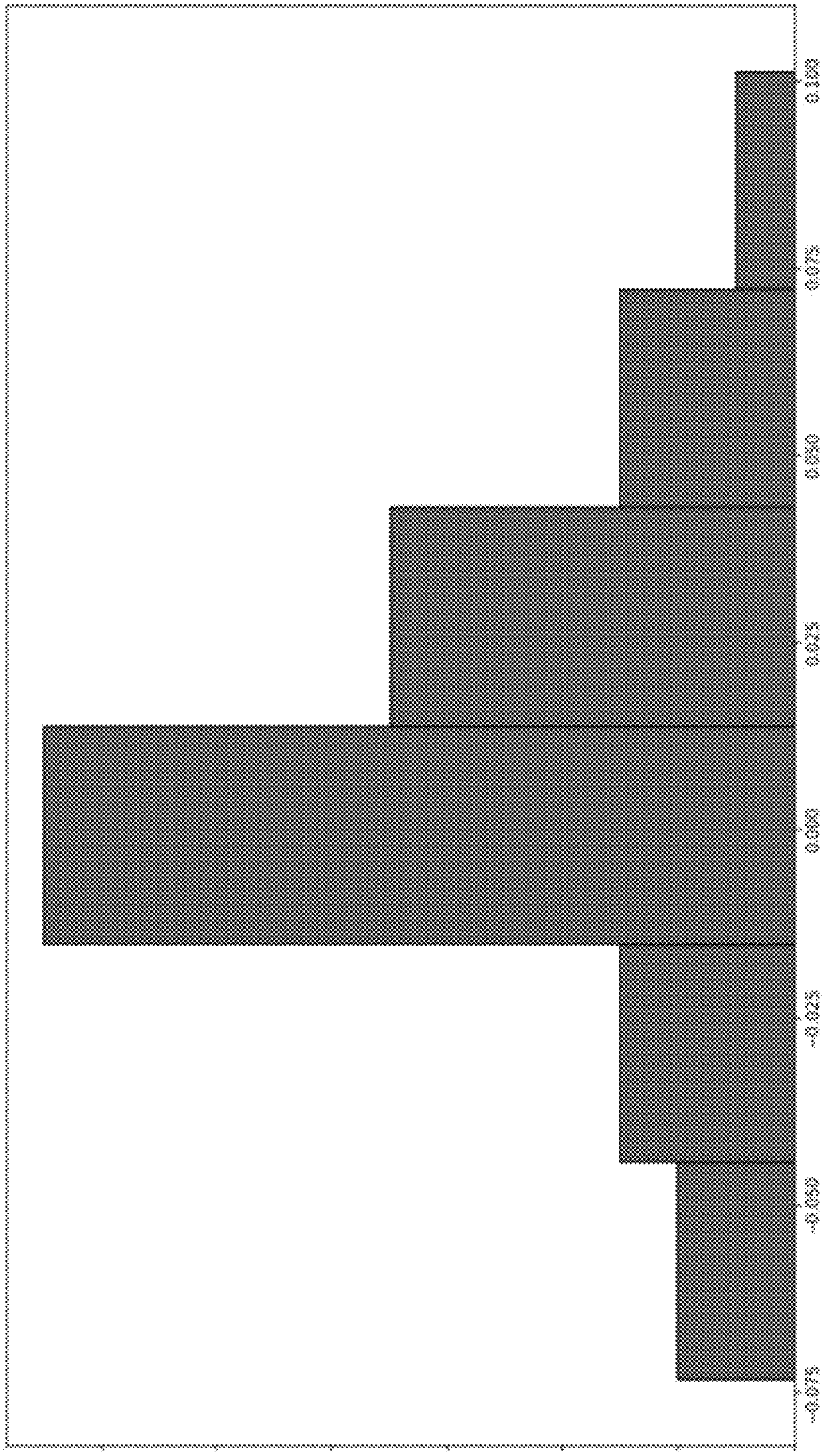
FIG. 23 Model residual error normal distribution providing goodness of fit, using the proposed mathematical formula (3)

| Test Condition | Network condition profile | Packet Loss (%) | Static Delay (RTT in ms) | Random Jitter (single trip values, applied on both paths) | | Jitter spikes (round trip delay on spike) | |
|---|---|---|---|---|---|---|---|
| | | | | stdev (ms) | Average (ms) | Delay spike (ms) | Interval (s) |
| C1 | [RTT] | 0 | 25 | 0 | 0 | 0 | 0 |
| C3 | | 0 | 50 | 0 | 0 | 0 | 0 |
| C4 | | 0 | 100 | 0 | 0 | 0 | 0 |
| C6 | | 0 | 200 | 0 | 0 | 0 | 0 |
| C8 | | 0 | 300 | 0 | 0 | 0 | 0 |
| C10 | | 0 | 400 | 0 | 0 | 0 | 0 |
| C13 | [PL] | 5 | 2 | 0 | 0 | 0 | 0 |
| C17 | | 25 | 2 | 0 | 0 | 0 | 0 |
| C19 | | 45 | 2 | 0 | 0 | 0 | 0 |
| C0 | [RTT, PL] | 0 | 2 | 0 | 0 | 0 | 0 |
| C21 | | 0.2 | 25 | 0 | 0 | 0 | 0 |
| C22 | | 1 | 25 | 0 | 0 | 0 | 0 |
| C24 | | 5 | 25 | 0 | 0 | 0 | 0 |
| C26 | | 0.2 | 50 | 0 | 0 | 0 | 0 |
| C27 | | 1 | 50 | 0 | 0 | 0 | 0 |
| C29 | | 5 | 50 | 0 | 0 | 0 | 0 |
| C31 | | 0.2 | 100 | 0 | 0 | 0 | 0 |
| C32 | | 1 | 100 | 0 | 0 | 0 | 0 |
| C34 | | 5 | 100 | 0 | 0 | 0 | 0 |
| C42 | [Jitter spikes] | 0 | 0 | 0 | 0 | 50 | 5 |
| C44 | | 0 | 0 | 0 | 0 | 200 | 15 |
| C45 | | 0 | 0 | 0 | 0 | 1500 | 15 |
| C46 | | 0 | 0 | 0 | 0 | 1500 | 45 |
| C47 | | 0 | 0 | 0 | 0 | 50 | 15 |
| C48 | | 0 | 0 | 0 | 0 | 200 | 5 |
| C53 | [Random jitter] | 0 | 0 | 3 | 25 | 0 | 0 |
| C54 | | 0 | 0 | 6 | 25 | 0 | 0 |
| C40 | | 0 | 0 | 9 | 25 | 0 | 0 |
| C55 | | 0 | 0 | 12 | 25 | 0 | 0 |

Fig. 24 (Table 1) Network condition profiles applied by NetEm. Each profile has unique network test conditions, 29 in total

| Question Code | Description | Question |
|---|---|---|
| QoE | Quality Of Experience | How do you rate the overall quality of your gaming experience? |
| QoE1 | Quality Of Experience on Bus | I would continue to play the match under the current network conditions on the move ("Bus", "Train"). |
| AC | Willingness to Continue (Yes NO) | Would you continue playing the game in the current state? |
| PR | Player Performance | How would you rate your performance in the match? |
| CN1 | Control Over Interaction | I felt that I had control over my interaction with the game. |
| RE1 | Notice No Delay | There was a large delay between my actions and the outcomes. |
| CN2 | Control Over Game | I felt a sense of control over the game interface. |
| RE2 | Input Responsiveness | The responsiveness of my input was as I expected. |
| CN3 | Control of Actions | I felt in control of my game actions |
| IF1 | Immediate Feedback Actions | I received immediate feedback on my actions |
| RE3 | Inputs Applied Smoothly | My inputs were applied smoothly |
| IF2 | Notified about Actions | I was notified about my actions immediately. |
| AQ1 | Audio Quality | How do you rate the overall audio quality? |
| VQ1 | Video Quality | How do you rate the overall video quality? |
| IM1 | Found it Impressive | I found it impressive. |
| CO1 | Felt Successfully | I felt successful |
| NE1 | Found Bored | I felt bored. |
| IM2 | Detached from world | I felt detached from the outside world while using the game |
| FL1 | forget about outside | I forget everything about me while playing the match |
| TE1 | Felt Frustrated | I felt frustrated. |
| NE2 | Tiresome | I found it tiresome. |
| TE2 | Irritated | I felt irritated. |
| CO2 | Achieved goals of game | I achieved the goals of the game applying my knowledge |
| FL2 | Felt Absorbed in game | I felt fully absorbed in the game. |
| PO1 | Felt Contented | I felt contented |
| CH1 | Game challenging | The game is appropriately challenging for me, the tasks are not too easy nor too difficult. |
| CH2 | Put a lot of effort | I had to put a lot of effort into it |
| PO2 | Play this match again | I would like to play this match again. |

Fig. 25 (Table 2) Post-match questionnaire that each participant in the experiment answers after every match

| Setting | Description |
|---|---|
| Map Type | Dust 2 |
| Match Goal | Kill Enemies |
| Weapon of Choice | Assault Rifle M4A4 |
| Team of Choice | Counter-Terrorist |
| Adversary Type | Normal Bots |
| Number of Enemies | Max of 4 ( enemies can respawn after death) |
| Match Duration | 90s |
| Player Attribute1 | Can respawn after death |
| Player Attribute2 | Reduced damage by 80% |

Fig. 26 - (Table 3) Match sequence configuration

| Function | Coefficients |
|---|---|
| $F_{RTT}(rtt)$ | $b_{RTT}$= 2.505277<br>$c_{RTT}$=199.83837 |
| $F_{RJ}(stdev_{nj})$ | $b_{RJ}$=119.81151<br>$c_{RJ}$=7.36004<br>$d_{RJ}$=0.44872 |
| $F_{SJ}(spikesize_{sj})$ | $b_{SJ}$=1.11406<br>$c_{SJ}$= 502.68376 |
| $F_{PL}(pl,rtt)$ | $ba_{PL}$=0.653<br>$bb_{PL}$= 9.02198<br>$bc_{PL}$=14.80819<br>$ca_{PL}$=0.22450<br>$cb_{PL}$=31.68406<br>$cc_{PL}$= 12.31748 |

Fig. 27 (Table 4) Coefficients of the calibrated static parameters as part of the proposed mathematical function to estimate the Quality of Experience score

| | Correlation | RMSE (MOS) | MAE (MOS) | Probability of Error < 0.25 MOS (70%) | Probability of error < 1 MOS (99%) |
|---|---|---|---|---|---|
| Proposed mathematical formula (3) | 0.9958 | 0.137 | 0.097 | 93.1% | 100% |

Fig. 28 (Table 5) Statistical performance results of of the proposed mathematical formula (3)

METHOD AND SYSTEM FOR EMULATING ADAPTIVE NETWORK TRAFFIC PACKET PATTERNS OF INTERACTIVE SERVICES FOR MEASURING USER EXPERIENCE

RELATED APPLICATIONS

Priority is claimed to U.S. Provisional Patent Application No. 63/430,300 filed Dec. 5, 2022, and to U.S. Provisional Patent Application No. 63/437,333 filed Jan. 5, 2023. The contents of the aforementioned applications are incorporated by reference in their entirety.

FIELD OF THE INVENTION

The subject matter of the invention concerns user experience estimations of interactive services in mobile networks.

BACKGROUND

The deployment of the novel network technologies, such as LTE and 5G, makes interactive services to be ever more present in everyday life. For instance, interactive services involving Augmented Reality (AR)/Virtual Reality (VR), mobile gaming, real-time multimedia, remote-controlling and supervising machines (ex. drones, surgery, vehicles). That is, interactive over the top (OTT) services are those services deployable on a given computing device, where the user is communicating, participating, and/or consuming the service over the network. Testing the quality of such interactive OTT services is a complicated task. Such services are built in different ways and, thus, each has unique requirements for hardware, software, and network, but also users may interact with them in a variety of ways and conditions. Measuring the user experience of an interactive OTT service is, therefore, a complicated task. Simply, there are a multitude of influencing factors contributing to the user experience. However, one key problem is the abundance of interactive OTT services, since each would require individual tailor-made quality testing solutions. Take the cloud gaming applications as an example. Therein, each application may be using its own gaming platform, servers, and clients, its own streaming application protocol, using variety of combinations for transport protocol, and support variety of audio/video codecs and resolutions. Thus, each cloud gaming application would require its own solution for testing network impact on interactivity, which is complicated and redundant process.

Typical quality testing tools, require access to specific information of the users' devices as well as access to the bitstream exchanged between the service and the user. Such quality testing tools are becoming increasingly problematic as performing automatic quality testing using user's data can be against user agreements and also made very difficult by the vendor of the operating system in the device. In addition, service developers are encrypting their traffic, meaning that the required data may not be available. Operators and regulators usually have a network centric view on their Quality of Experience (QoE) and Quality of Service (QoS) testing, meaning the network's influence on the quality is what matters for them. This leads to the need of generic OTT interactive service testing, where the focus is on analyzing the OTT service's network traffic behaviour. Each interactive OTT service uses a specific Internet Protocol (IP) for data exchange within the service nodes which shapes the network communication. Then, the communication and the data exchange have a specific pattern, such as the amount of network packets exchanged during a window of time, the size of the network packets, and the sending/receiving frequency of the packets. The protocols and the configuration of the data exchange depends on the type of the interactive OTT service, which typically can be highly interactive such as real time (e.g., voice/video conversational services, interactive control, cloud gaming), less interactive such as semi real time (e.g., social media), or minimally interactive such as non-real time (e.g., download/upload for later usage, record voice messages). The transport protocols on top of IP, as well as the shape and frequency of the data exchanged within the service is open information which is possible to be monitored and analysed with network sniffing tools.

Network testing tools using generic testing techniques, which are in the scope of the present application, would analyse and group the OTT services based on the utilized communication protocols, shape, and exchange frequency of the data within the service. The scope of the generic testing techniques is to understand how the network condition affects the communication between the client and the server. For instance, the communication within the service is different when the user has a static location, as opposed to when the user is on the move and consuming the service, such as in a vehicle. Upon learning the traffic patterns per OTT service, as well as the impact of the network conditions, it would be possible to create a generic testing technique that emulates the network traffic packet pattern of the service. That is, create a testing setup resembling a real OTT service's client and server, and start a data exchange (e.g., by using pre-defined network stimuli) that emulates the real network traffic packet pattern of the OTT service. However, the generic testing technique needs to be adaptive in order to be able to modify the shape of the emulated network. For instance, modify the emulated traffic patterns based on the selected OTT service, its network requirements, and the network conditions.

PRIOR ART

The literature concerning QoE has covered multiple areas involving interactive OTT services. QoE has been evaluated in video streaming applications [1], [12-16], voice over IP [2], [16-17], mixed reality [3], autonomous vehicles [4], and video games [5, 6, 18]. The cited papers identify a set of service and network performance metrics that impact the user experience and evaluate it. As an evaluation criterion, papers describe uses of multiple approaches involving mathematical and machine learning models.

The study [4] proposes a taxonomy to understand the QoE aspect related to interactive services. The taxonomy differentiates and categorizes influencing factors, interaction performance metrics, and quality features in four layers. The influencing factors are data related to the physical and network component of the service, as well as metrics related to the specific application and its logical components. The study [4] gives an example of modeling the QoE for autonomous vehicles, covering complex communication between the vehicle and service's servers, directly among vehicles, but also between the vehicle and road infrastructure. Thus, there are several different network links per vehicle that support simultaneous communication. For instance, the vehicle can be remotely controlled from distance where the vehicle streams heavy video in uplink, while receiving light remote control stream in downlink. Therefore, the quality of the network communication is of the utmost importance for successful operation of the service. Some of the considered network performance metrics are RTT, jitter, packet loss, bandwidth, and radio signal measurements (RSSI, RSRP, RSRQ, etc.). 3GPP defines network quality requirements for remote-controlled operations, where the one way delay of the video stream should be around 150 ms on a 1 Gbps link, while the remote-control stream should have 10 ms RTT on a 1 Mbps link [7].

Video streaming applications can be generally divided into adaptive and real-time. The first one, adaptive video streaming applications, covers streaming pre-recorded videos. That is because video frames are buffered at the client's device before they are played on the screen. The term adaptive refers to the way servers detect quality/performance of the client's network access and processing abilities in real-time, adjusting the media quality accordingly. YOUTUBE® and NETFLIX® are examples of adaptive video streaming services. The server encodes the video content at multiple bit rates, while the user's client feedback tells the server to switch between streaming the different encodings depending on available resources. The adaptation is based on spatial (adapt the number of streamed pixels), temporal (adapt the number of streamed frames), and compression (adapt the quantization parameter) [1]. The studies [1], [14,15] surveys the QoE modeling for adaptive video streaming applications. The QoE models are heavily based on application performance metric, such as rebuffering frequency and its duration, frame rate, bit rate, codec, resolution, quantization parameter, and memory.

The real-time video streaming applications send live video to the clients. Twitch and live-TV stations are examples of such applications. As opposed to the adaptive video streaming, real-time services put greater emphasis on the network-related performance metrics regarding QoE [12-13]. Due to buffering capabilities and nature of TCP as a transport layer protocol, adaptive streaming applications do not suffer from video data loss. Unlike adaptive streaming, the real-time video streaming applications QoE is impacted by delay, jitter, packet loss, and bandwidth [12-13].

Video gaming is another interactive real-time service and there are several studies that perform subjective tests to evaluate gaming QoE. The studies [6], [13], looks at parameters such as PSNR, bitrate, and frames per second and maps them into QoE. These are performance metrics that require access to the actual data that is being exchanged between the gaming client and the gaming server. For instance, PSNR requires comparison between the, on client side, actually displayed video frames and server-side representative version of original video frames with no distortions. PSNR can illustrate the quality degradation caused by blockiness and the spatial fidelity of the video. Frame rate is a metric that illustrates how many frames are displayed per second. The study [6] calculates the QoE with a non-linear mathematical function based on the video quality (PSNR), reactiveness (frame rate), and positive effect (combination of PSNR and frame rate). In order to evaluate the performance of the QoE model, the studies [6], performs subjective tests by gathering 21 participants to play two video games, while measuring their user experience. The studies by [5], uses different sets of performance metrics, such as jitter, delay, and packet loss in order to evaluate the video game QoE. The study performs experiments by having 22 participants playing three different games—Fortnite, Overwatch, and CS:GO. First, the study [5] shows the difference between online games and cloud games with respect to delay, observing that cloud games are more impacted than online games. Then, the study [5] looks at the relationships between jitter and packet loss, as well as between delay and packet loss. It concludes that when packet loss is added, additionally adding jitter will not affect the user experience. However, adding packet losses on top of adding delay impacts the user experience. The study [5] then uses a non-linear mathematical function to model delay, jitter, and packet loss with respect to the recorded subjective scores from the 22 participants. It should be noted that all prior art referring to video gaming QoE does not address the interactivity component of the gaming QoE.

The study [8] proposes a generic quality testing tool for video games. A generic quality testing tool means that the traffic pattern of the service is being modeled, but not the actual service. The study proposes one static traffic pattern, which is artificially created to cover the following phases of the video game: initial phase, highly interactive, sustainable, and trailing phase. The study claims that the difference among the phases is in the required bandwidth. During the network communication between a video game client and server, the study considers the following parameters: Packet rate, packet size, packet delay budget (if exceeded the packet is considered lost), and test duration. Based on such parameters, the study [8] extracts the bandwidth, RTT, jitter, and packet loss values. The study then uses an s-shaped logistic function per packet RTT. The study [8] then multiplies the logistic function with linear functions for the other parameters, in order to create multi-parameter function for measuring gaming interactivity.

DRAWBACKS OF PRIOR ART

The study [4] proposed general guidelines and a high-level QoE model for interactive services, having autonomous vehicles as a use-case. Besides stressing the importance of the cellular network and the network performance metrics in the context of QoE, the study does not define how the network traffic looks like for a general interactive service. Consequently, the study [4] doesn't discuss the impact of the network conditions and mobility on the traffic patterns. Thus, the study [4] neglects the opportunity to create a generic testing tool based on the traffic patterns, but rather proposes a way to evaluate QoE during the run-time of the interactive service itself by measuring different performance metrics in real-time. There is, also, no discussion on the importance of subjective tests for evaluating the QoE, but rather the study [4] develops a strategy for objectively evaluating the QoE. Thus, there are no guidelines for conducting subjective tests or a taxonomy on how to perform subjective tests for interactive services.

There are several models and techniques in evaluating QoE for video streaming applications. As discussed in the studies [1], [12-15] the models regarding video streaming applications use application specific metrics—requiring access to the video frames and the memory of the client's device. However, such models do not consider understanding the effect of the application specific metrics on the network traffic packet pattern in order to emulate it. In addition, none of these models address the interactivity QoE component of the service.

The study [8] proposes a generic quality testing tool for video gaming. As mentioned, the study proposes a single traffic pattern for gaming and then uses TWAMP to stream the traffic pattern from a client to a server. TWAMP is a protocol that sends data packets from one place to another and then back again with the purpose of measuring network performance metrics. However, TWAMP and, thus, the study [8] does not support adapting the traffic pattern for asymmetrical number of packets. That is, if a packet is sent at time t0 from the client, the same packet will be reflected to the client from the server at time tn, where n considers the time over network and processing time at the server. Thus, there is the same amount of packets going from the client to the server (also called upload traffic) and from the server to the client (called download traffic). However, a real video game simply does not work like that—where, for instance, a cloud-based FPS video game would send significantly more packets in downlink as opposed to the uplink, and that is a feature missing in the study [8]. Then, the cloud-based FPS video game would be streaming 120 frames per second (fps), which corresponds to streaming bursts of packets every 8 milliseconds. There is also other type of packets and bursts exchanged at other rates, and the distribution over time window defines a packet train. How many packets and/or bursts of packets are within one packet train, their sizes, as well as the waiting times between the packets and/or between the bursts of packets may be different in uplink and downlink. Such adaptation of the traffic is also not considered in the study [8]

Another major drawback of the study [8] is the understanding of how user experience is affected by the network performance metrics (e.g., RTT, jitter, packet loss). The study [8] does not perform any form of subjective tests to collect the user experience, but yet they claim to measure it. Ideally, functions such as in [8] consists of static variables which are supposed to be tuned with respect to the subjective scoring from real participants in order to determine the shape of the curve. The tuning algorithm should be based on the idea that the solution obtained for a given problem (e.g., gaming interactivity) moves towards the best solution considering, for example, root mean squared error (RMSE) or correlation (R) metrics [9]. However, the study [8] does not record any measurement values for user experience, making it impossible to tune the static parameters within the s-shaped function and determine the optimal shape of the curve. Thus, the function, its optimization, and the measured gaming interactivity value in the study [8] is misleading as the parameter tuning is based on false assumption and there is no baseline to evaluate the function validity.

Moreover, user experience formula in the study [8] considers multiplying the individual functions for each of the metrics, using an s-shaped function multiplied with two linear functions and due to several reasons, it is unlikely a linear function represents the subjective QoE.

SUMMARY

As discussed above, one key problem in predicting network performance of an OTT service is that each OTT application would require its own solution for testing network impact on user experiences, which is a complicated and redundant process.

A solution for the problem would be creating generic and adaptive quality testing technique for the existing and the upcoming interactive OTT services. A generic and adaptive quality testing solution would enable mobile network operators to perform any network operational activity (e.g., troubleshoot, optimize, performance/user experience evaluation) for the most challenging conditions (e.g., high demanding bandwidth, extreme low latencies) created by the interactive OTT services. Thus, one objective of the present application is to create a generic and adaptive quality testing technique for interactive OTT services.

In comparison to the study [8], the uniqueness of the present application is related to the use of subjective tests in order to understand the relationship between the user experience and the traffic patterns considering the network conditions. Typically, there are multiple network conditions and phenomena that affect the user experience in mobile networks—such as cell load, interference, doppler effect, handover, etc. For instance, a high cell load will create large RTT and jitter. Thus, such network conditions are reflected in the measurement of RTT, bandwidth, jitter, and packet loss.

One uniqueness of the present application is the discovery of the way network conditions impact the network traffic packet pattern between the client and the server. For instance, the network traffic packet pattern will be different when the user plays a video game while travelling in a vehicle or train, as opposed to playing at home. Similarly, the network traffic packet pattern will look differently when there is presence or absence of cell load, interferences, doppler effect, handover, etc. Correspondingly, the present application proposes a method to dynamically adapt the emulated traffic pattern between the client and the server according to the measured network conditions. Such adaptation will then allow to measure the metrics to the same values as the service would have experienced.

The previous section discusses the prior art, while the following section distinguishes the subject matter of the present application in comparison to each of the individual cited studies. There are several directions when explaining the uniqueness of the present application, including: subjective testing of interactive services; emulating and dynamically adapting an interactive service traffic pattern; estimating a user experience score for the emulated interactive service. In the following, drawback of the prior art is presented together with arguments on the uniqueness of the present approach.

In contrast to [8], which does not use subjective user experience, the present application builds a user experience function based on subjective tests.

Also in contrast to [8], the present application defines the size of the packets and/or bursts of packets within a packet train, duration of a packet train, waiting times within a packet train and between trains, waiting times at the server, as well as the amount of packet trains streamed in uplink and downlink.

Further contrast to [8] which multiplies the individual functions (mostly linear) for each of the metrics, the present application takes the position that there are non-linear dependencies among two specific metrics, RTT and packet loss, and just a normal multiplication of their respective two functions will lead to false results. Thus, the present application proposes a way to specifically model RTT and packet loss in a way to reflect the collected user experience from the subjective tests.

The present application also contemplates that a network condition and/or a set of network conditions, which describe similar network quality, determines a specific emulated traffic pattern. For each emulated traffic pattern, the measured metrics represents how the real service perceives the network, and consequently leads to a more accurate estimation of the user experience score. In the present application, user experience is collected from subjective testing and mapped to the traffic patterns, which is an approach that distinguishes the subject matter of the present application from the rest of the QoE models. Thus, the present application is unique in this regard.

Similar arguments hold true for the QoE models on video streaming [1], [12-15] and video gaming presented by the studies [5, 6, 18]. The models [5, 6, 18] conduct subjective testing with participants playing real games, however, they only match the recorded user experience to the objective network performance metrics with the sole purpose of estimating the user experience, while completely ignoring the analysis of the network traffic packet pattern. In addition, none of the mentioned QoE models for video streaming ([1], [12-15]) and gaming ([6], [18]) do address the interactive component.

The present application argues that it is not obvious for a skilled person in the area to combine the two approaches—evaluate the QoE of an interactive service and create an adaptive emulating network traffic packet pattern out of which the user experience is estimated. This is because the cited papers on QoE in interactive OTT services [1, 4, 5, 6, 8, 12-15, 18] fail in covering the following areas:

- Evaluate the network traffic packet patterns created by the service.
- Evaluate the impact of the network traffic packet pattern on the user experience.
- Consider the way network traffic packet patterns change based on the network conditions.
- Emulate an interactive OTT service and dynamically adapt the network traffic packet pattern.
- Estimate the user experience score based on the emulated network traffic packet pattern.
- Consider the interactivity component in the QoE model Similarly, the cited studies regarding the creation of artificial network traffic packet pattern [8] fail to cover the following areas:

- Emulating an interactive service network traffic packet pattern.
- Dynamically adapting the amount of packets sent in uplink and downlink.
- Dynamically adapting the shape of the emulated data when it comes to the amount of network packets per packet trains and the size of individual packets as well as the size of the packet trains themselves.
- Dynamically adapting the sending times between the packets and between the packet trains at the client.
- Dynamically adapting the waiting time at the server before replying to the client.
- Defining an emulating time-window for the packet trains based on the selected interactive OTT service, for example, considering the frames per second (FPS) configuration of the service.
- Consider the way emulated traffic patterns change based on the network conditions.
- Map the emulated network traffic packet pattern to subjective user experience score.
- Estimate the user experience score based on the emulated network traffic packet pattern.

The subject matter of the present application concerns methods and systems for measuring user experience in interactive services. One method describes the procedures to measure user experience of an interactive OTT service. One system represents a software tool that can be used to measure user experience of an interactive OTT service. The aforementioned method is applicable to any interactive OTT service. The aforementioned system presented in the present application covers an example of one interactive OTT service—cloud mobile gaming service.

The method presented in the present application has four main components:

1. Subjectively testing an interactive OTT service
2. During subjective testing, artificially injecting network disturbances in the communication between the client and the server
3. Understanding the shape of the network traffic packet patterns throughout the subjective tests
4. Creating a mathematical model to estimate, in real-time, a user experience score of the interactive OTT service based on the network conditions.

A combination of those four components is the basis of the aforementioned method presented in the present application. The subjective testing covers experiments for an interactive OTT service, where users are recruited to use the service during a window of time, after which the users answer questions related to their experience and quality of the service. In parallel with the subjective tests, the method consists of artificially injecting network disturbances on the network link between the client and the server. For instance, adding larger RTTs, jitter, and packet losses, where their combination form network condition profiles.

The method records the network traffic exchanged between the client and the server tests with an aim of understanding its patterns. The network traffic packet pattern may be impacted by several sources, including:

1. The way the user interacts with the service, such as faster or slower interactions
2. Different stages of the service during runtime, such as initialization or highly interactive phase
3. The adaptation to network conditions, such as packet losses creating re-transmissions.

Then, the key feature of the proposed method is finding a correlation between the network condition profiles and the recorded network traffic packet patterns, as well as between the network condition profiles and the user experience. That is, a certain combination of the network condition profile will impact the user experience and the network traffic packet pattern in a unique way. The final step of the method is creating a mathematical model for estimating the user experience. The mathematical model is calibrated by considering the collected subjective user experience scores from the users and the network conditions profiles. Then, the model expects values for the network conditions profiles as input in order to estimate the user experience.

The aforementioned system contemplated in the present application incorporates the resulting model from the presented method into a software tool that is capable of emulating the traffic pattern of an interactive OTT service, having a cloud gaming service as a use-case. That is, deploying the software tool on a client (acting as a gaming client—e.g., a mobile phone) and a server (acting as a gaming server—e.g., a Steam-link streaming server). The software tool deployed on the client is able to send/receive network packets to/from the server, thereby emulating typical communication between a cloud game client and a cloud game server. While emulating the communication, the tool is able to measure network-related performance metrics, as described in the above method—packet loss, delay, and jitter. The uniqueness of the proposed system lies in its ability to dynamically adapt the emulating network traffic packet pattern. This serves two use cases:

1. Adaptability for the traffic patterns within the context of an OTT service such as cloud gaming.
2. Adaptability for traffic patterns of variants and/or different OTT services such as another cloud gaming, and/or video streaming In the first case, the adaptability concerns dynamically modifying the network traffic packet pattern based on the measured network condition while the tool is emulating the cloud gaming service. For instance, the traffic pattern will have different shape when the client (e.g., mobile phone) is experiencing poor mobile network in comparison to normal mobile network conditions.

In the second case, the tool enables manually adapting the network traffic packet pattern, to use in the dynamic adaptation of traffic pattern, based on the OTT service requirements. That is, manually changing the configuration of the network traffic packet pattern, such as its packet sizes, sending frequency, respond time, network protocols, etc.

The system presented in the present application, while emulating the cloud gaming service, is then able to utilize the calibrated mathematical formula from the proposed method in order to translate, in real-time, the measured network-related performance metrics into a user experience score estimate for the cloud gaming service.

The benefits of the method and the system concerns both mobile network operators and OTT service developers. The mobile network operators would benefit from using the proposed method and system for measuring the impact of their network on the user experience of particular applications, as well as optimizing their network accordingly. This optimization improves the network and avoids churn and also attracts new customers. For instance, mobile operators may use the system to measure the user experience of mobile cloud gaming service on a public train journey from A to B to troubleshoot at which points of the journey their network underperforms. For this purpose, the client part of the software tool must be deployed on a device with central processing unit (CPU) capabilities and be physically present on the train. The client tool will then communicate with the server part (deployed somewhere on the internet) to emulate the OTT service, measure the network conditions, adapt the emulated traffic, and estimate the user experience score.

The OTT service developers may benefit by improving the service. Examples:

1. By using the proposed method and system in parallel to the service, the OTT service developers can objectively evaluate the impact on user experience during stress-test of their infrastructure.
2. The OTT service developers can find the acceptable number of concurrently active users through aforementioned the stress tests (example #1 above) while scaling up the stressing, i.e., scaling up the number of concurrently active users on a set of infrastructure, and thereby determine when more infrastructure is required.
3. Use the proposed method and system to continuously monitor the running of the service and detect when something has reached a level of experience deemed necessary to try and improve.
4. OTT service developers may use the proposed method and system during research and development process to identify for which network degradations their current approach has weaknesses and thus focus improvements on.

BRIEF DESCRIPTION OF THE DRAWINGS

The subject matter of the present application may be best explained through the attached drawings in which:

FIG. 1 shows Examples of interactive Over the Top (OTT) services;

FIG. 2 shows network packet exchange between a client and a software within an interactive OTT service;

FIG. 3 shows example measurement of the jitter;

FIG. 4 shows an experimental setup to get user experience in a controlled setting in which network conditions are controlled to gauge user experience;

FIG. 5 shows the flow of experiments using the setup of FIG. 4;

FIG. 6 shows research flow for creating a utility function that measures the quality of experience;

FIG. 7 shows statistics of the recorded dataset for the QOE question;

FIG. 8 shows characteristics of network traffic packet patterns;

FIG. 9 shows recorded gaming network traffic packet patterns for three network conditions;

FIG. 10 shows a system which implements the present method, emulates an interactive OTT service, dynamically adapts the traffic pattern, and estimates the user experience;

FIG. 11 shows characteristics of network traffic packet patterns;

FIG. 12 illustrates the RTT impact on the four different quality dimensions (QoE, CN1, VQ1, AQ1). The symbols represent the average score (1 to 5) from the participants for the respective questions;

FIG. 13 illustrates the PL impact on the four different quality dimensions (QoE, CN1, VQ1, AQ1), while RTT is 2 ms constant. The symbols represent the average MOS score (1 to 5) from the participants for the respective questions;

FIG. 14 illustrates the PL impact on the four different quality dimensions (QoE, CN1, VQ1, AQ1), when RTT is 25 ms constant. The symbols represent the average MOS score (1 to 5) from the participants for the respective questions;

FIG. 15 illustrates the PL impact on the four different quality dimensions (QoE, CN1, VQ1, AQ1), when RTT is 50 ms constant. The symbols represent the average MOS score (1 to 5) from the participants for the respective questions;

FIG. 16 illustrates the PL impact on the four different quality dimensions (QoE, CN1, VQ1, AQ1), when RTT is 100 ms constant. The symbols represent the average MOS score (1 to 5) from the participants for the respective questions;

FIG. 17 illustrates the Random Jitter impact on the four different quality dimensions (QoE, CN1, VQ1, AQ1). The symbols represent the average MOS score (1 to 5) from the participants for the respective questions;

FIG. 18 illustrates the Jitter spikes impact on the four different quality dimensions (QoE, CN1, VQ1, AQ1), when the frequency interval is 5 seconds. The symbols represent the average MOS score (1 to 5) from the participants for the respective questions;

FIG. 19 illustrates the Jitter spikes impact on the four different quality dimensions (QoE, CN1, VQ1, AQ1), when the frequency interval is 15 seconds. The symbols represent the average MOS score (1 to 5) from the participants for the respective questions;

FIG. 20 illustrates the Jitter spikes of 1500 ms impact on the four different quality dimensions (QoE, CN1, VQ1, AQ1), when the frequency interval is either 15 or 45 seconds. The symbols represent the average MOS score (1 to 5) from the participants for the respective questions;

FIG. 21 illustrate the Jitter spikes of 200 ms impact on the four different quality dimensions (QoE, CN1, VQ1, AQ1), when the frequency interval is either 5 or 15 seconds. The symbols represent the average MOS score (1 to 5) from the participants for the respective questions;

FIG. 22 shows a scatter plot of the estimated MOS using the proposed mathematical formula (3). The x-axis represents the measures subjective scores, while the y-axis represents the estimated scores;

FIG. 23 shows model residual error normal distribution providing goodness of fit, using the proposed mathematical formula (3);

FIG. 24 presents a table (Table 1) showing the 29 Network condition profiles used in the experimental setup of FIG. 4, each profile having unique network test conditions;

FIG. 25 presents a table (Table 2) showing the post-match questionnaire that each participant in the experiment answers after every match;

FIG. 26 presents a table (Table 3) showing match sequence configuration for the game used in the experimental setup of FIG. 4;

FIG. 27 presents a table (Table 4) comprising coefficients of the calibrated static parameters as part of the mathematical function to estimate the Quality of Experience score; and FIG. 28 presents a table (Table 5) presenting the statistical performance results of the proposed mathematical formula (3).

DETAILED DESCRIPTION

In the following description, for the purposes of explanation, numerous specific details are set forth to provide a thorough understanding of the present invention. It will be apparent, however, that the present invention may be practiced without these specific details.

1. The Concept of Interactive OTT Services

FIG. 1 shows examples of interactive OTT services to which the present invention is applied. It is noted that the shown infrastructure is only one possible implementation, and additional infrastructure, assets and/or connections may be added, subtracted, or replaced, as desired. The illustrated infrastructure may be composed of any interactive OTT service, such as autonomous vehicles, video streaming, video gaming, and AR/VR services. Consequently, each service is composed of client and server nodes. For instance, the users of the video streaming service belong to the client node 101, while the video streaming service servers belong to the video server node 108. The various client nodes 100, 101, 102, and 103 may have different physical or virtual properties. For instance, the client node 100 may be a physical wearable head-set device, 101 may be a mobile phone application, 102 may be a physical vehicle, and 103 may be a desktop personal computer (PC). The clients on FIG. 1 communicate with their respective interactive service servers, which are hosting the service. The communication is carried out through a wireless network provided by an internet service provider (ISP), via the S10, S11, S12, and S13 wireless links. The wireless network provided by the ISP may be in the form of various 3GPP supported network generations, such as 4G/LTE and 5G, offering mobile subscriptions to users. The ISP's infrastructure consists of a cell site 104, connected to the ISP's core network 105, which can redirect any incoming network traffic to its desired destination over the internet 106 via the wired network links S14 and S15. Thus, the ISP's infrastructure and network are enablers for the communication between the services' clients and the respective servers. In a typical interactive OTT service, the service's servers receive and process a request from a user (i.e., the service's client) with specific information, after which an appropriate response is sent back to the client. For instance, a user opens the mobile application of a video streaming service 101 which generates multiple requests to the service's servers 108 via the S11, S14, S15 and S17 network links—such as verification of the user, loading the welcome screen, etc. The service's servers process the requests and send back responses—such as approving the user login and suggesting videos to watch. The user may then further interact with the service by choosing to play one of the suggested videos, which triggers a request to the service's servers, followed by a response.

1.1. Understanding Mobile Network Conditions

FIG. 2 shows a network communication 119 between a user of a video gaming client 110 and a gaming server 118. The network communication is typically bi-directional, meaning that the client and the server can send and receive network packets simultaneously. The exchanged data is encapsulated within a transport header, defining the transport protocol, followed by an Internet Protocol (IP) header that enables the network nodes between the client 110 and the server 118 to understand their location on the Internet. The network packets are processed at the base station 115, network core 116, and the internet 117, crossing the network links S20, S21, S22, and S23. Typically, the client 110 sends a client transmitted packet train 111 that consists of packets Pox, . . . , P3, P2, P1, where the sending time per packet is represented by the corresponding timestamps tx, . . . , t3, t2, t1. Then, the server 118 receives the same packet train as a server received packet train 112, with corresponding receiving timestamps and sends a response (i.e., a server transmitted packet train 113) to the gamer with packets Py, . . . , P3, P2, P1 with corresponding sending timestamps. Finally, the client receives the server response as a client received packet train 114, capturing the packets Py, . . . , P3, P2, P1 at their corresponding receiving timestamps. The shape of the packet trains 111, 112, 113, 114—such as number of packets, their size, and sending frequency will depend, in this case, on the gaming service. For instance, the resolution of the game and the frames per second affects the length of a packet train, size of individual packets within and their sending time distribution. The sending and receiving timestamps, as well as the packet number, are important when measuring network performance. It is understood that spacings between the timestamps t1, t2, t3, . . . , tx within any one of the packet trains 111, 112, 113, 114 will differ from the remaining packet trains.

One network performance metric of interest for the present application is round trip time (RTT). RTT is measured in the following way:

- The RTT time measurement starts at the client 110 when the first packet P1 of the client transmitted packet train 111 is sent on the network, considering its sending timestamp t1. There is a pre-defined waiting time between packet P1, P2, P3, and Px, visible through their respective sending timestamps t1, t2, t3, . . . , tx.
- The server 118 receives the packets in the order as they arrive as the server received packet train 112. The server has a predefined waiting time for the packets after which the packets are considered as lost.
- The server sends back a server transmitted packet train 113 in a similar procedure as train 111.
- The client receives the client received packet train 114 and similarly has a timeout before considering packets to be lost.
- The RTT is measured from the timestamps, for instance, ((t1[train 114]−t1 [train 111])−(t1[train 113]−t1[train 112])) is the RTT of the packet P1. In other words, the RTT does take into account any internal delay within the server 118. RTT can be measured per individual packet within a train and/or for a whole packet train by subtracting the corresponding timestamps. For instance, ty [train 114]−t1 [train 111]−(t1[train 113]−ty[train 112]) is RTT for the packet train pair 111/114.

The RTT cannot be measured for packets only sent in one direction, i.e., when there is no packets sent in the opposing direction.

Another network performance metric of interest for the present application is per direction trip time, one way trip time (OWTT). OWTT requires synchronized clocks on client and server.

OWTT is measured in the following way for the uplink (from client to server):

1. The uplink OWTT time measurement starts at the client 110 when the first packet P1 of the client transmitted train 111 is sent on the network, considering its sending timestamp t1.
2. The server 118 receives the packets in the order as they arrive. The server has a predefined waiting time for the packets after which the packets are considered as lost.
3. The uplink OWTT is measured from the timestamps, for instance, t1 [train 112]−t1 [train 111] is the uplink OWTT of the packet P1. Uplink OWTT can be measured per individual packet within a train and/or for a whole packet train by subtracting the corresponding timestamps. For instance, ty[train 112]−t1[train 111] is the uplink OWTT of for the whole packet train pair 111.

WTT is measured in the following way for the downlink (from server to client):

1. The downlink OWTT time measurement starts at the server 118 when the first packet P1 of the server transmitted train 113 is sent on the network, considering its sending timestamp t1.
2. The client 110 receives the packets in the order as they arrive. The client has a predefined waiting time for the packets after which the packets are considered as lost.
3. The downlink OWTT is measured from the timestamps, for instance, t1[train 114]−t1 [train 113] is the downlink OWTT of the packet P1. Downlink OWTT can be measured per individual packet within a train and/or for a whole packet train by subtracting the corresponding timestamps. For instance, ty[train 114]−t1[train 113] is the downlink OWTT of for the whole packet train pair 111.

Another network performance metric of interest for the present application is Downlink (DL) and uplink (UL) throughput. Downlink would represent the packets going from the server 118 to the client 110, such as the packet train 113/114. Uplink would be the opposite way, for instance the packet train 111/112. It is possible to measure both DL and UL throughput at the client 110 with the following procedure:

1. A delta time is calculated by taking the difference of last and first packet timestamp in receiving (in case of UL, such as of server received packet train 112; in case of DL, such as of client received packet train 114) packet train.
2. Summarizing the number of bits sent between these two timestamps.
3. UL or DL throughput is then the number of bits divided by the corresponding delta time.

Another network performance metric of interest for the present application is jitter. Jitter describes the change in trip delay, delay variations (DV). Jitter is typically measured as change in two consecutive delay measurements designated IPDV for inter-packet delay variations, or the delta to the shortest delay in a time window, designated PDV for packet delay variations. Jitter can be measured per direction and/or for the round trip, and does not require synchronized clocks.

In the following, FIG. 2 is used to give an example of the way different type of jitter may be measured:

- Uplink IPDV, the first value is the delta in uplink OWTT for P2 and P1 which can be measured as t2[train 112]−t1[train 112]−(t2[train 111]−t1[train 111]). Subsequent values are measured in the same way.
- Downlink IPDV, the first value is the delta in downlink OWTT for P2 and P1 which can be measured as t2[train 114]−t1[train 114]−(t2[train 113]−t1[train 113]). Subsequent values are measured in the same way.
- Round-trip IPDV, the first value is the delta in RTT for P2 and P1. Subsequent values are measured in the same way.
- Uplink PDV, the first value is the delta in uplink OWTT for P1 and the packet with the lowest delay on uplink. Subsequent values are measured in the same way.
- Downlink PDV, the first value is the delta in downlink OWTT for P1 and the packet with the lowest delay on downlink. Subsequent values are measured in the same way.
- Round-trip PDV, the first value is the delta in RTT for P1 and the packet with the lowest RTT. Subsequent values are measured in the same way.

Similarly, the corresponding jitter types can be measured on the train level where the timestamps for the train are on sending sides the timestamp for the first packet in the train, t1, and on the receiving side is the timestamp for the last packet in the train, ty.

FIG. 3 shows an example of the measured delay variations for one interactive service, containing base delay, random jitter, and jitter spikes.

Base delay represents the minimum time the service delivers a packet under close to ideal conditions. On FIG. 2, there is a minimum time for the packet P1 to travel forth and back due to physical limitations and design and utilization of the technology transporting the packets.

Random jitter is frequent changes, typically many times per second, to the delay often caused by variations in load (usage of the network from other entities and/or services) and emphasized by communication systems using timeslots and radio links. The random jitter is characterized by delay changes of less than 50 ms. Random jitter is experienced in an interactive service in two ways, the average is experienced as an increase of the base delay, and the variations itself increases the difficulty to accurately and consistently perceive and interact with the service.

Jitter spikes may be characterized by delay changes lasting greater than a first predetermined length of time and at a frequency of less than once per a second predetermined length of time and is typically only occurring at most once per second. In one embodiment jitter spikes arc characterized by delay changes greater or equal to 50 ms and a frequency of happening less often than once per second. In mobile access networks, jitter spikes are often observed in not so good radio conditions when reaching the border between cells with short disruptions in the network access link, amplified by possible load and reduced radio resources in "outer" cell coverage.

Another network performance metric considered in the present application is packet loss. It is measured per packet train in the receiving end of the server (UL packet loss) and in the receiving end of the client (DL packet loss). Any packet not received before packets from the next (subsequent) train, or before a settable timeout is set, is considered lost.

The above-mentioned network metrics and/or their statistics can be used to define a network condition and/or estimating the user experience.

1.2. Understanding the Mobile Network Performance

There are several combinations of causes for possible poor network performance, reflected through the OWTT, RTT, throughput, jitters, and packet loss. Starting from the gaming server 118 on FIG. 2, the network performance may depend on the capacity of the server 118. In case the sever becomes overloaded, such as in cases when too many clients attempt to access it, it may result with longer RTT, larger jitters, and packet losses. Similar with the public internet 107. Longer RTT, larger jitters, and packet losses may be created depending on the physical distance between the client and the server. For instance, if a server 118 is located somewhere in Australia, while the client 110 is somewhere in Europe, the packet train 111 will need to traverse over multiple cross-continental network links, creating large network overhead. Additional hardware and software limitations may appear at the mobile operator's network (nodes 115 and 116). First, the network resources at the base station 115 are managed at a millisecond level basis, however, they are limited and at times, like during peak-hours, the base station 115 may experience high network loads resulting with poor network performance. For instance, multiple users attempt to access the Internet at the same time. However, the most impact on the network performance typically lies within wireless network link S20, due to the physics of signal propagation. For instance, there is a physical limitation on how far can the client 110 be located from the base station 115, considering the used radio frequency, in order to receive, understand, and send data. In addition, there are physical limitations in cases the client 110 is moving and physically changing locations during the network communication 119. Various phenomena may impact the network performance, such as interferences (e.g., electromagnetic and inter carrier), noise, reflections, doppler effect, handovers, etc.

3GPP is a standardization body for cellular mobile networks which has already defined acceptable ranges for various network performance metrics in multiple interactive services, including gaming, video streaming, AR/VR, remote controlling, etc [1, 2, 3, 4, 5, 6]. For instance, the target network performance values for gaming are <50 ms one way trip time (OWTT), <10^-3 packet error rate, and >1 Gbps data speed [7]. The scope of the present application is to evaluate how the network performance impacts the gamer's user experience. In particular, the aim can be to setup a gaming infrastructure as illustrated on FIG. 2 where it will be possible to artificially tweak the network performance while users play a mobile video game and at the end describe their experience on a mean opinion scale. Table 1, seen in FIG. 24, contains 29 network conditions, grouped in network condition profiles. Each of these 29 network conditions contain a unique value for the network performance metrics—RTT, packet loss, random jitter, and jitter spikes. The intention is each user to play a game under all the 29 network conditions and then rate his or her user experience for each network condition. As an example, user A plays 29 game-matches where each game-match is experiencing one randomly assigned network condition from Table 1.

2. Cloud Game Experimental Setup to Build a Database of Subjective User Experience FIG. 4 shows the experimental setup that has been tested as part of the present application. As one example of an interactive OTT service, the experimental setup targets cloud gaming service over mobile networks. Among all games' genres, the First Person Shooter (FPS) is one of the richest in multisensory experiences of intensive visual motional graphics, high quality surround audio effects, gameplay interactions and mechanics. Therefore, this genre is one of the most sensitive to mobile network impairments. Among the many different FPS game titles, Counter Strike Global Offensive (CS:GO) is selected, due to the game's popularity as it is used for eSports competitions and its feasibility to be delivered over mobile networks. In addition, CS:GO allows straight forward game match customization and supports installation of dedicated servers, both crucial for performing a well-controlled test.

The experimental setup consists of three main modules—the game service 130, the network 140, and the gamer 150. The game service module 130 consists of two laptops, one for the CS:GO server 131, running a dedicated CS:GO game server, and the other one for the cloud gaming server 132. The gamer module 150 consists of cell phone 154, which is running the cloud game client configured for 120 Hz refresh rate and verified to achieve stability when no network degradation is applied. It is configured to use surround sound. Then, the gamer module 150 consists of Xbox One gamepad 153 connected to one of the USB-hub ports of the USB-C multiport adapter and used by the gamer/users as input device to play the CS:GO match. The gamer also has a wireless surround headphone 152, wirelessly connected to one of the USB-hub ports of the USB-C multiport adaptor. It has been used to provide the surround audio playback for gamer/user. The last piece of equipment in the Gamer Module 150 is the Tablet PC 155 which displays a questionnaire to be answered by the gamer right after a CS:GO session (match round). All the user equipment (152, 153, 154, 155) is interconnected via USB-C multiport adapter 151, which is also used to provide the cell phone with ethernet connectivity. The network module 140 represent the network links between the game service 130 and the gamer 150, including the network router 141. The network router 141 is responsible for delivering communication between the Game Service Module 120 and Gamer Module 150 as well as provide internet access (using 4G LTE network) for account authentication. The Network Module 140 consists of three laptops (142, 143, 144) all with dual ethernet connections to pass network traffic, and all installed with the NetEm software for artificially tweaking the performance of the network links between the client and the server.

The Game Service Module 130 and the Gamer Module 150 are using service Steam Remote Play through their software named SteamLink. In particular, the Cloud Gaming Local Streaming PC server 132 executes CS:GO game client, streamed later to the Phone client 154 using the SteamLink client application. SteamLink is one of the most popular gaming platforms for remote play as of today.

The three laptops (142, 143, 144) have the NetEm software installed with the following configuration:

- Laptop 142 is responsible for simulating jitter spikes, used to generate the variance of the spikes' amplitudes during a game session (match round). It generates saw-tooth shaped high amplitude and low-frequent delay incidents/peaks. The jitter spikes are applied for the whole game sequence (match round), on both downlink and uplink directions, with half of the amplitude per direction.
- Laptop 143 simulates random jitter, used to generate the variance in delay following a distribution that models real-life LTE environment. The values for average and standard deviations are based on real-live LTE network in different scenarios (e.g., load, configurations) and time of the day. The jitter spikes are applied for the whole game sequence (match round), in both the downlink and uplink directions.

Laptop 144 generates static delay and packet losses in the network communication. The requested static delay is divided by 2 and then applied on traffic on both downlink and uplink directions for the whole game sequence (match round). The packet loss ratio is applied on traffic on both directions as well.

The laptop 131, besides the CS:GO server, is also running a setup control center software which is developed to automate the whole process of the experiments. The setup control center software has the following functionalities, listed in no particular order:

Randomize the network test condition conditions (Table 1—FIG. 24) and use them in 29 match sequences for each participant.

Start and stop a game sequence according to game session settings.

Making sure all the questionnaires are displayed to the Tablet PC 155 at the right time, as well as locally storing the participants' answers with correct timestamps.

Execute the NetEm scripts to the corresponding laptops 142, 143, and 144 based on the selected network condition for a match sequence. Execute scripts to capture network data/logs from the laptops 142, 143, and 144.

2.1. Game Session (Match Round) Settings

Table 3, seen in FIG. 26, shows the configuration of the CS:GO game session, which is played by each of the players. A fixed game session settings assures that the results from the subjective scoring are not biased towards specific game settings. It assures that each player has same settings/options during a game session. For instance, the players can select only one game team (e.g., counterterrorist), only one weapon, and play always one against four computer bots. This is done to ensure that variations in the players' subjective assessments are not due to differences in in option offered by the game.

2.2. Flow of the Subjective Experiments

FIG. 5 presents the flow of conducting the subjective experiments. Before starting the experiments, participants were recruited 201 where each participant (gamer) signed a consent form and started the experiments by answering a pre-test questionnaire 203 which covers demographics and past gaming experience questions. Each participant had a chance to play a warmup session 204 using the experimental setup to get familiar and adjust the controls of the game according to their likings (e.g., sensitivity). The warmup was played without any network disturbances.

During the real test, each participant 202 had 29 unique test conditions 205 to play which were loaded in a randomized manner. Each of the 29 test conditions contain a unique set of network disturbances (shown on Table 1), which are imposed on the network communication. A single network condition is applied throughout the whole game match, which has a duration of 90 seconds. Between changing test conditions, participants were allowed to take breaks and even stop the test if they felt like doing so. Each participant answered a post-match questionnaire 207 after each of match sequences (questionnaire shown on Table 2, seen in FIG. 25). The post-match questionnaire contains questions that capture the subjective user experience of that particular match sequence.

During the game matches, network traffic logs were recorded 208 which describe the communication between the video game client and the server. The logs are analysed in post processing 208 in order to determine the network traffic packet patterns observed for the 29 network conditions individually for an average participant. As a result, it was observed that the network traffic packet patterns differ from condition to condition, meaning that the network conditions have influence on the characteristics of the network communication between the video game client and server. These characteristics of the network traffic 209 are illustrated on FIG. 10 and described later in the following sections.

At the conclusion of the 29 game matches, each participant then answers an after-test feedback questionnaire 210, which captures the final thoughts of the participant about the games as well as possible fatigue and tiredness after the experiments.

2.3. Results from the Subjective Experiments

FIG. 6 describes the research flow once the experiments were completed. First, the recorded subjective dataset from the experiments was extracted from the subjective experiments 300 and cleaned from the post-match questionnaire 301. The cleaning process entails removing outliers due to faulty measurements or execution of certain test processes, fixing or removing incorrect, corrupted, incorrectly formatted, duplicate, or incomplete data within a dataset.

Then, statistics of the dataset is computed 302, which includes grouping the subjective answers by the participants per network condition, which are 29 conditions in total. The statistics of the answers may be plotted per each network condition profile. The statistics are used to find correlation and inter-dependencies among network conditions and participants' answers 304. For instance, FIG. 7 shows the mean and standard deviation (stdev) of the data set, i.e., grouping the answers of the participants for the QOE question per network test condition. Specifically, FIG. 7 illustrates the median MOS based on the condition with the box indicating a range of values from the 25th-75th percentile with the dots showing outliers. With FIG. 7, the QOE scores' stdev values for each of the conditions have been calculated and all the values are below the expected value of 1.5 MOS (Mean Opinion Score), with two exceptions which reach 2 MOS. Although a value of stdev=2MOS is not unexpected, those cases have been analysed to verify if there is no specific voter causing the larger variation, but this was not the case. It has been identified that it was the condition itself which determined larger spread of the scores. The two conditions (RTT=50 ms, PL=5%) and (jitter spike=50 ms @ every 15 sec) which showed a higher stdev of the scores, contained more degradation in the output quality (mainly video) rather than in the input quality (interaction/control). Therefore, with stdev within expected values ranges, the outliers' analysis showed the test's robustness and the validity of its results.

FIG. 12 shows the subjective average scores for all participants regarding the RTT network condition profile (e.g., RTT=[0, 25, 50, 100, 200, 300, 400], from Table 1—FIG. 24). Each of the plots show the average scores representing the answers to the following 4 quality dimension (questions): QoE, CN1 (part of Input Quality), AQ and VQ (parts of Output Quality). FIG. 12 shows that both QoE and CN1 quality dimensions follow closely each other, with no significant differences, and show fairly stable quality up to around 50 ms, and a slight drop above roughly 100 ms. Then a significant drop is noticed for values above 100 ms, while above 300 ms the quality enters the bad quality region.

Basically, the impact flattens out. Thus, it can be concluded that an RTT<100 ms indicates on average a good QoE and CN1 quality for cloud gaming over mobile networks. FIG. 12 unveils another aspect in case of RTT—the participants clearly distinguish different between VQ/AQ and QoE/CN1 quality dimensions. Both AQ and VQ dimensions show consistent and stable quality up to 400 ms, while QoE and CN1 degrade to the poorest score. Restated, scores for both AQ and VQ are not sensitive to RTT, while scores for QoE and CN1 are.

FIG. 13 shows the subjective average scores for all participants regarding the PL network condition profile for each of the quality dimensions, while the RTT has a constant value of 2 ms (e.g., PL=[0, 5, 25, 45], from Table 1—FIG. 24). Statistically, there are no significant differences among the four quality dimensions (QoE, CN1, VQ1, AQ1). Slightly larger differences are noticed for PL<5%, where CN1 is less impacted than QoE, AQ, and VQ. Above PL=25% the VQ is slightly less affected than AQ, CN1 and QoE. In addition, a stable and fairly good quality (around 3.8 MOS) is showed to be up to about 25% PL. After that a significant drop to very bad quality happens. Unlike the RTT case of FIG. 12 though, video and audio quality show similar behaviour with QoE and CN1. An overall conclusion which can be derived from FIG. 12 is that PL metric impacts cloud gaming at the same level as it would impact video/audio streaming. Therefore, once the network is optimized to ensure minimal PL for video/audio streaming, then it confidently will ensure cloud gaming quality as well.

FIG. 14, FIG. 15, and FIG. 16 show the impact of PL and RTT combination on the quality dimensions. The higher the RTT, the more sensitive to PL become all cloud gaming quality's dimensions, QoE and CN1, AQ and VQ. In addition, the differences between the 4 quality dimensions become larger when RTT increases—from almost no impact for RTT=25 ms, regardless of PL (0.2%-5%) to significant impact for RTT=100 ms. The latter proved to be even more significant for very low PL (0.2%-2%). Therefore, it can be concluded that RTT is the one with the most impact, even if both RTT and PL degradations are simultaneously present. However, for RTT=50 ms, low PL values (0.2-2%) can have a significant impact, which proves a non-linear interdependency between RTT and PL.

FIG. 17 shows that at average jitter value of 25 ms with stdev>6 ms, the QoE and VQ dimensions are dropping significantly, with video being the most sensitive one. Quality degradations AQ and CN1 remain stable and good (3.5-4 MOS) even up to 12 ms stdev. It can be concluded that random jitter is of less concern for CN1 quality dimension, but more for VQ streaming which ultimately impacts cloud gaming QoE. FIG. 17 further reveals that when gamers feel quite capable of interacting with the game/characters (CN1), then the overall perceived QoE can be higher, even though the VQ is quite poor.

FIG. 18, FIG. 19, FIG. 20, and FIG. 21 show the impact of jitter spikes values as well as their frequency of occurrences during the game sequence (match round). FIG. 18 and FIG. 19 show that all 4 quality dimensions (QoE, CN1, AQ, VQ) are almost not affected by the frequency of occurrence, but rather more by the amplitude of the jitter. Values of amplitudes increasing to 200 ms can cause quality drops for around 0.5 MOS, slightly more for lower frequencies of occurrences. The higher impact of the jitters' amplitude rather than their frequency of occurrence is best proved in FIG. 20 and FIG. 21 where the quality for all 4 dimensions stays the same for the same amplitude of the jitter value, with the jitter occurring each 5 or 15 seconds (200 ms delay) and occurring each 15 and 45 seconds (1500 ms delay). In addition, QoE and CN1 quality dimensions are more affected than audio and video. In the case of jitter spikes conditions, basically the QoE dimension is defined by the CN1 dimension.

3. Measuring User Experience with Utility Functions

The research flow on FIG. 6 continues with building a mathematical formula (model) to estimate a user's subjective experience based on measured parameters such as RTT, PL, random jitter and spiky jitter obtained while network traffic packet patterns are varied.

The process begins by analysing each question from the Table 2 (FIG. 25) separately. That is, for each question 305, it is possible to create a mathematical formula 306 that will consider the participants' answers per network condition profile, which are 4 in total (Table1—FIG. 24). For instance, create a mathematical formula that will fit the [RTT] network condition profile. Therein, the mathematical function needs to be calibrated by considering the average answers for all the test conditions—[25 ms], [50 ms], [100 ms], [200 ms], [300 ms], [400 ms]. The mathematical function as in (1) represents the satisfaction or pleasure on a scale that participants receive for consuming a good or service [10]. Thus, given a small set of known average MOS for the network test conditions within a network condition profile, the function will be able to produce a satisfaction or please score (MOS) for any possible (unknown) combination of network test conditions for the given network condition profile. That is, fitting the network condition profiles into a mathematical function to estimate MOS. There are many different forms of such functions. Some examples are linear, polynomial, logistic, exponential, or logarithmic functions [10].

The process on FIG. 6 is completed when the calibration 307 reaches an optimal performance score (e.g., using R-squared and Root Mean Squared Error) for all four network condition profiles. The calibration 308 entails tuning the static parameters of the function in order to increase the accuracy of estimating the participants' MOS. Then, a combination of the mathematical functions is the final function 309 for a given question and, thus, the function is ready to be used.

Combinations of mathematical functions are used to estimate the quality of experience (QoE) of the cloud-based video game. For example, if the combination is a product of each of the mathematical functions, and there is one such mathemathical function per metric, and there are N number of network metrics, then there will be a product of N network metric functions. Building on that concept of a product of all per network metric functions, first, each of the network conditions profiles are fitted and calibrated into individual symmetrical sigmoid functions, a variant of network metric functions, towards the recorded scores of the participants. Second, in a preferred embodiment, the overall QoE score as part of the present application is defined by the multiplication of these symmetrical sigmoidal functions. It is noted here that while QoE is the subjective metric that is estimated in this embodiment, it is understood that one may instead build a mathematical function specific to one of the other subjective metrics represented in Table 2.

The selection of sigmoid function per network metric as well as their multiplication to determine the QoE score is based on the following:

best descriptor of the human perception, ensuring monotonous behaviour outputting values between 0 and 1 (end points of the quality scale) to ensure the saturation and cut-off positions enabling extension of the QoE score formula to other metrics The following (1) sigmoidal curve is used for calibration on the four network conditions profiles:

$$F_{sigmoid}(x) = d + \frac{1-d}{1+\left(\frac{x}{c}\right)^{b}} \tag{1}$$

Such sigmoidal curve per network metric results in having coefficients per metric which can be generically referred to as $b_{Metric}$, $c_{Metric}$ and $d_{Metric}$. And to simplify as often as possible the value of $d_{Metric}$ could be set to 0 for some metrics.

The process starts by fitting the recorded participants' QoE scores into (1) for each of the four network condition profiles [RTT], [PL], [Random Jitter], [Spiky jitter]. The static parameters b and c are, thus, calibrated per profile in order to yield a set of functions that when multiplied together produces the best accuracy score when estimating the recorded QoE scores.

RTT Sigmoid. Regarding the [RTT] network condition profile, the following sigmoid function is applied:

$$F_{RTT}(rtt) = \frac{1}{1+\left(\frac{rtt}{c_{RTT}}\right)^{b_{RTT}}} \tag{2}$$

RTT is a metric which exemplifies when the $d_{Metric}$ coefficient can be set to 0 and eliminated from the function.

Similar process is applied for the other three network condition profiles. At the end this process, the overall QoE is defined as multiplication of the four individual sigmoidal functions, one per each network condition profile:

$$QoE(rtt, pl, stdev_{rj}, spikesize_{sj}) = F_{RTT}(rtt) * F_{PL}(pl, rtt) * F_{RJ}(stdev_{rj}) * F_{SJ}(spikesize_{sj}) \tag{3}$$

PL Sigmoid. Extensive testing and evaluations showed that the complex non-linear interdependency between the two network condition profiles [RTT] and [PL] cannot be accounted for just by the multiplication of the two sigmoid functions, for PL and for RTT, but rather only by a 2D function for PL that takes as second variable the RTT:

$$F_{PL}(pl, rtt) \tag{4}$$

Several approaches have been experimented, such as simple linear interpolation/extrapolation around and in between the round-trip delay values for which packet loss data was available or more complex 2D curve fitting. However, the solution which proved to meet both the statistical performance requirements and showed minimal number of coefficients (to avoid over-training) has the sigmoidal function for packet loss also being dependent on RTT, and is defined by:

$$F_{PL}(pl, rtt) = \frac{1}{1+\left(\frac{x}{F_{PL_c}(rtt)}\right)^{F_{PL_b}(rtt)}} \tag{5}$$

Where actually b and c have been manually studied to fit a sigmoid for the group of PL conditions changing with round-trip time, respectively $F_{PL_c}$(rtt), $F_{PL_b}$(rtt).

Iterative tests showed that a straightforward implementation of the sigmoid function in (5) resulted in inconsistencies (higher scores for worsening conditions) and a half exponential showed to be the best fit.

$$F_{halflife}(x) = a + \frac{b}{2^{\frac{x}{c}}} \tag{6}$$

Applying curve fitting of PL towards changes in b and c over RTT resulted in two functions:

$$F_{PL_b}(rtt) = ba_{PL} + \frac{bb_{PL}}{2^{\frac{rtt}{bc_{PL}}}} \quad F_{PL_c}(rtt) = ca_{PL} + \frac{cb_{PL}}{2^{\frac{rtt}{cc_{PL}}}} \tag{7}$$

And consequently, it yielded the following PL function, which describes the PL effect at different RTT values:

$$F_{PL}(pl, rtt) = \frac{1}{1+\left(\frac{pl}{ca_{PL}+\frac{cb_{PL}}{2^{\frac{rtt}{cc_{PL}}}}}\right)^{\left(ba_{PL}+\frac{bb_{PL}}{2^{\frac{rtt}{bc_{PL}}}}\right)}} \tag{8}$$

Random Jitter Sigmoid. The simplified symmetrical sigmoid didn't capture that the RJ did not reach "0" as the lowest score, but rather flattened out at a higher value. Therefore, a full sigmoid was required, and it proved to work well with minimal number of coefficient possible:

$$F_{RJ}(stdev_{rj}) = d_{RJ} + \frac{1-d_{RJ}}{1+\left(\frac{stdev_{rj}}{c_{RJ}}\right)^{b_{RJ}}} \tag{9}$$

Spiky Jitter Sigmoid. The curve fitting for the spike jitter using the simple symmetrical sigmoid showed good statistical performance, and no inconsistency in the output (QoE) score and derivative when compared with measured data.

$$F_{SJ}(spikesize_{sj}) = \frac{1}{1+\left(\frac{spikesize_{sj}}{c_{SJ}}\right)^{b_{SJ}}} \tag{10}$$

The coefficients of the static parameters after the calibration, for the formula (3), are presented in Table 4, seen in FIG. 27.

While Table 4 presents specific values for the various coefficients, it is understood that slight variations from these coefficients may also work well. In some embodiments, varying the coefficient values buy ±5% or even ±10% may provide acceptable results.

Furthermore, instead of formula (3) above, the formula can be extended to take into account other parameters, and these additional parameters can also be represented in the formula in the form of additional sigmoidal functions. For instance, parameters directed to resolution and framerate may also be used, in which case formula (3) would be modified as follows to formula (11):

$$QoE(rtt,\ pl,\ stdev_{rj},\ spikesize_{sj},\ \text{resolution},\ framerate) = F_{RTT}(rtt) * F_{PL}(pl,\ rtt) * F_{RJ}(stdev_{rj}) * F_{SJ}(spikesize_{sj}) * F_{RES}(\text{resolution}) * F_{FFR}(framerate) \tag{11}$$

It is understood that in some embodiments, not all of the individual sigmoidal function may be used, and so other combinations of the above-mentioned, and even other, sigmoidal functions are possible. However, the sigmoidal functions corresponding to $F_{RTT}$ and $F_{PL}$ are likely to be included in any formulas due to their impact on user experience.

Each of the sigmoidal functions has a value between 0 and 1, and so both formula (3) and formula (11) return a value between 0 to 1. And both formulas have a value of 1 when the metrics shows no network degradation. But the subjective test uses an ACR (Absolute Category Rating) scale in the range 1 to 5, and so the formula's QoE value may then be adjusted as follows: Adjusted Score=1+4*QoE to bring the adjusted value in line with the ACR range of 1 to 5.

As a practical matter, however, the QoE score is also affected by resolution, frame rate and other factors (e.g., the game, controller type, physical screen size, etc.). As a consequence, the average subjective scores invariably are under 5, even when there is no network degradation, since user experience is affected by the aforementioned resolution and framerate experienced by the user. On the ACR scale we may then obtain a modified Adjusted Score=1+(QoE*k*4) where k is a scalar for the subjective score with those metrics showing no degradations. And it is this k that can be handled by extending the function with more sigmoids, such as the aforementioned $F_{RES}$ and $F_{FR}$.

Also, while function (3) specifically pertains to the QoE estimate, it is understood that the form of this function, as well as that of function (11) immediately above, can also be used to estimate the results from any of the other subjective questions listed in Table 2. Thus, generally speaking, the form of the above functions is applicable to estimating any "user experience metric" (UEM) and so is not limited to estimating only QoE. It is understood, then, that the aforementioned parameters rtt, pl, etc. are relevant to estimating all of the various user experience metrics.

Table 5, seen in FIG. 28, shows the statistical performance of the proposed mathematical formula (3), regarding correlation, RMSE and MAE. In addition, Table 5 also presents the probability of the prediction error below 0.25 MOS and below 1 MOS, which both prove to meet the requirements from ITU-T as a standardization body (70%, respectively 99%).

FIG. 22 shows the scatter plot indicating the performance described in Table 5. An additional statistical analysis has been performed on the residuals resulted in the calibrating of the mathematical formula (3) with the scope of evaluating its "goodness of fit". It is expected that a good curve fitting towards a data set which has normal distribution, as can be expected subjective test results, should have a normal distribution of the residuals. A Shapiro-Wilks test was applied to test the hypothesis of normal distributed residuals, and the results show a high p-value of 0.87. Therefore, the hypothesis cannot be rejected, meaning that the residuals have a normal distribution. FIG. 23 represents a histogram of the residual errors, showing the normal distribution as well.

4. Profiles of Network Traffic Packet Patterns

During the experiments with the gamers, the game traffic patterns was recorded and analysed, shown on FIG. 5 with 108. The traffic pattern data has been recorded separately from the network interfaces at the network module 140 on FIG. 4. The idea is to reconstruct the traffic patterns in post-processing to understand the traffic behaviour which will be later used in a software tool to emulate gaming traffic patterns, to create generic gaming traffic patterns. The network traffic recorded at the laptop 143 includes all the traffic to and from the gamer module 150, including re-transmissions caused by the network conditions induced by the NetEm mobile network simulator. The network logs at the laptop 143 were recorded using tcpdump command line tool.

FIG. 8 shows an example of the characteristics of a network traffic packet pattern observed in the network communication between a video game client and server. Briefly, the characteristics of network traffic patterns, where the packet train 0 and packet train 2 are sent from the client to the server, while packet train 1 is sent from the server to the client. The $\Delta_3$ is the server's waiting time before sending a response back to the server, while $\Delta$s is the client's waiting time before sending new packet train to the server. The other $\Delta_0, \ldots, \Delta_2$ and $\Delta_4, \ldots, \Delta_6$ and $\Delta_9$, $\Delta_{10}$ are the waiting times between the packets, within their corresponding packet trains, before they are streamed. Specifically, the video game client initiates the communication by sending a packet train 0, consisting of 4 network packets P0, P1, P2, and P3, each with varying size in bytes. The amount of network packets within a packet train, as well as the size of the individual packets largely depends on the configuration of the type and requirements of the service. The CS:GO video game hosted on a SteamLink server is capable of streaming 120 frames per second, which means that one packet train will be 8 milliseconds long. For instance, packet train 0 is 8 ms long and the size of the P0 is 200 bytes, P1 is 200 bytes, P2 is 200 bytes, and P3 is 100 bytes. Besides the duration of the packet train, the amount of packets within the train and their size, the characteristics of the network traffic packet pattern consist of sending time of the packets $$\left(\text{e.g., } T_{0_{P0}}\right),$$

but also the time $\Delta$ between the network packets, as well as between the packet trains. That is, within the packet train 0, there is $\Delta_0$, $\Delta_1$, $\Delta_2$, and $\Delta_3$ waiting time between the packets P0, P1, P2, and P3 respectively. The communication is followed by a response from the server with packet train 1, with packets P4, P5, P6, and P7, with the corresponding sending times and waiting time $\Delta$ between the packets. The unique part of the present application is the realization that the network conditions during the communication between the client and the server have a direct impact on the characteristics of the network traffic, as discussed with FIG. 4 with 208 and 209 nodes. That is, the network conditions will dictate the amount of packet trains and the amount of network packets within. Similarly, the network conditions will have an impact on the sending times of the packets $$\left(\text{e.g., } T_{0_{P0}}\right)$$

and the waiting times A between the packets and packet trains. Thus, each network condition will result in that the network traffic has a unique pattern.

FIG. 9 shows three unique network traffic packet patterns, corresponding to test conditions C0, C19 and C40 (seen in Table 1—FIG. 24), and recorded during the subjective experiments discussed with FIG. 4 and FIG. 5.

FIG. 9 includes the achieved average throughput per gamer for the clean (no errors) condition C0 (Table 1—FIG. 24) during the 90 seconds game sequence (match round). The results show that the downstream throughput varies from around 5 Mbps to 10 Mbps, although the gamers have the same gaming settings. The throughput variations might be caused by the set of actions which the gamer choses to take, such as a visiting certain place on the map (e.g., being passive/hidden awaiting enemies), or random events like simultaneously meeting several enemies.

Additionally, FIG. 9 shows the achieved average throughput for condition C19 during the 90 seconds game sequence (match round). C19 has a 45% packet loss (Table 1—FIG. 24). The average downstream throughput from the server increases due to the necessary re-transmissions, averaging from around 12 to 18 Mbps.

Finally, FIG. 9 shows the average throughput for condition C40 (Table 1—FIG. 24), during the 90 seconds game sequence (match round). C40 is defined by random jitter of an average 25 ms with stdev of 9 ms. In this case, Steam Link sees the network conditions as poor; thus, the server attempts to reduce the streaming quality and consequently reduces the average achieved throughput, ranging from around 2 to 4 Mbps.

The results shown in FIG. 9 signal that it is challenging to create static generic traffic patterns for cloud gaming especially for FPS/CSGO genre, which is characterized by large throughput variations. In addition, besides the gamer's subjective actions, it is obvious that the experienced network conditions have a direct impact on the gaming traffic patterns. Therefore, it can be concluded that generic gaming traffic patterns need to be simulated in a dynamic manner based on the value profiles of measured network metrics (e.g., RTT, jitter, packet loss). In this way, the generic gaming traffic pattern is sensitive to the network conditions, which the generic gaming traffic pattern generator should dynamically adapt to as in real live.

5. Emulating an Interactive Service to Estimate Subjective Scores

FIG. 10 presents one embodiment of an infrastructure of the system tool of the present application. The goal of the system tool is to emulate the traffic patterns of an interactive service. The infrastructure consists of a client 160 and server 161 that emulate the traffic characteristics 162 of an interactive OTT service. For example, the client and the server can be deployed on any physical and/or virtual device with processing abilities and network connectivity.

FIG. 11 shows the flow chart of the system tool. After initiating the session 400, flow begins by selecting the interactive OTT service type to be emulated 401. This process is important as different services have different traffic requirements, considering the utilized communication protocols, the level of interactivity, and characteristics of network traffic. Such traffic requirements are known for the system tool, coming from the subjective experiments as described on FIG. 4 and FIG. 5.

Once the interactive OTT service type is selected, for instance a cloud-based video game service, the software tool attempts to connect to a server 402 and sends dummy network packets from the emulating client 403 in order to measure the current network conditions. The results from the network measurements during the dummy packet streaming will determine which of the pre-defined network traffic patterns will be emulated between the client and the server 404. For instance, FIG. 9 has 3 network traffic patterns for the cloud-based Steam Link FPS video game, one of which may be selected for emulation.

The process of emulation begins by pressing a button 405 in the software tool. The button initiates the streaming of network packets during a window of time 406 according to the pre-defined network traffic packet pattern. Such process is similar to the description in FIG. 8. The network packets, or the network stimuli, are packets which have the same characteristics as the actual packets of the service. For instance, in the case of the cloud-based Steam Link FPS video game, the Steam Link server streams packet trains containing video frames, while the server emulating the streaming in FIG. 11 will stream packet trains with the same characteristics regarding to at least size of the packets, number of packets, and how packets are spread in time.

During the network communication between the client and the server, the client measures the network conditions through network metrics, such as RTT, packet loss, and jitter 407. The measured network metrics are then used for two key processes: (1) estimating the user experience using the network metrics are input to the mathematical formula 408, as described on FIG. 6; and (2) determine what kind of impact the network conditions have on the network traffic 409.

For instance, considering FIG. 9, assume that the current network traffic packet pattern follows the Condition 0 patten (C0 of Table 2). Assume then that, suddenly, the client experiences some network degradations which are reflected through the measured network metrics. For instance, the RTT of around 2 ms, jitter 0, and packet loss of 45%, which correspond to the Condition 19. Then, the software tool is programmed to load the pre-defined network traffic packet pattern that corresponds to Condition 19. Thus, the software tool enables dynamic adaptation of the network traffic between the client and the server based on the network conditions.

The traffic pattern adaptation to the network conditions considers two aspects:

1. the number of adaptations per direction
2. the adaptation pace

For example, the number of adaptations per direction can consider the following:

- The different packet patterns for DL can be created by adjusting the number of packets representing the video where the traffic is represented by one to five packets of MTU size. Consequently, the DL can be represented by five patterns.
- Packet loss affects the packet patterns by increasing packets per second from server and/or from client. However, on DL, PL has a significant effect on the user experience scoring when the RTT is low enough (depending on service's settings) for a re-transmission mechanism to handle high rates of packet loss. This is not the case for today's mobile networks, and thus PL impact on packet pattern can be ignored even though detected packet loss could be used to dynamically add extra bursts, to emulate extra video/audio bursts, on the DL if it ever becomes relevant. For UL, the effect of packet loss is much more dramatic, a 5% packet loss rate can yield doubled packet/bit rate. However, the UL is much less strained than the DL, and therefore UL adaptation for PL can be ignored.

Large spikes in the delay cause a large increase in uplink traffic, possibly warranting a different packet pattern in those cases. Generally though, the traffic amount can be still fairly low versus the normal capacity and consequently the UL adaptation for jitter spikes can be ignored.

Similarly, for example, the adaptation pace can consider the following:

The adaptation of the packet patterns should correspond to the adaptation during the active gaming time (game match) of 90 seconds (value used in the subjective test).

A resolution for the measurements on gaming performance over mobile networks within the context of a drive test, needs to ensure a balance between the following:

drive test real-time characteristic feasible (practical) adaptation scheme of the tested service to the network conditions expected behavioural changes of the tested service's (a.k.a gaming) interactivity depending on the network conditions Based on the above-mentioned considerations, a set of 5 to 10 traffic patterns and a measurement time window of 10 seconds is reasonable for emulating the cloud gaming traffic with the purpose of estimating the user experience.

During the time window, a 40 ms (or 100 ms as mentioned above) packet pattern is used repeatedly when emulating cloud gaming traffic running 120 frames per second. Within each time window, a decision on the adaptation is made before the time window end is reached, typically 1 to 2 seconds before the end of the time window to handle any network connection disruptions at the end of the time window. The decision is based on the network condition as determined from the metrics measured on the received packet trains since the time window start, or directly decided from the measured network metrics during the time window.

The information for the server to use in deciding, or information decided by the client, as to which packet pattern to use in next time window is carried in the packet payload from the client to the server so the server knows what to send to the client to properly emulate the service traffic under the most recent network conditions.

At the end of the time window, the measured metrics are used to estimate the user experience (based on the formulas above) and typically stored to file together with metrics, time of the day, geolocation, as well as presented on the display to the user running the test. Optionally the result, and metrics and time of day and geolocation, can be forwarded in the packet payload to the opposing side for cloud storage and post processing.

REFERENCES

[1] Barman, Nabajeet, and Maria G. Martini. "QoE modeling for HTTP adaptive video streaming—a survey and open challenges." *Ieee Access* 7 (2019): 30831-30859.

[2] Daengsi, T. and Wuttidittachotti, P., 2019. QoE modeling for voice over IP: simplified E-model enhancement utilizing the subjective MOS prediction model: a case of G. 729 and Thai users. *Journal of Network and Systems Management,* 27(4), pp. 837-859.

[3] Hynes, E., Flynn, R., Lee, B. and Murray, N., 2022, June. A QoE evaluation of procedural and example instruction formats for procedure training in augmented reality. In *Proceedings of the* 13*th ACM Multimedia Systems Conference* (pp. 287-292).

[4] Minovski, D., Åhlund, C. and Mitra, K., 2020. Modeling quality of IoT experience in autonomous vehicles. *IEEE Internet of Things Journal,* 7(5), pp. 3833-3849.

[5] Schmidt, S., Zadtootaghaj, S., Sabet, S. S. and Möller, S., 2021, June. Modeling and Understanding the Quality of Experience of Online Mobile Gaming Services. In 2021 13*th International Conference on Quality of Multimedia Experience* (*QoMEX*) (pp. 157-162). IEEE.

[6] Zadtootaghaj, S., Schmidt, S. and Möller, S., 2018, May. Modeling gaming qoe: Towards the impact of frame rate and bit rate on cloud gaming. In 2018 *Tenth international conference on quality of multimedia experience* (*QoMEX*) (pp. 1-6). IEEE.

[7] 3GPP. "System architecture for the 5G System. TS 23.501, Release 16". Available: https://www.etsi.org/deliver/etsi_ts/123500_123599/123501/16.06.00_60/ts_123501v160600p.p df (2019).

[8] Rohde&schwarz. "White paper: Interactivity test". Available: https://www.rohde-schwarz.com/se/solutions/test-and-measurement/mobile-network-testing/white-paper-interactivity-test-concept-_252812. html (2022).

[9] Chicco, D., Warrens, M. J. and Jurman, G., 2021. The coefficient of determination R-squared is more informative than SMAPE, MAE, MAPE, MSE and RMSE in regression analysis evaluation. *PeerJ Computer Science,* 7, p. e623.

[10] Fiedler, M., Hossfeld, T. and Tran-Gia, P., 2010. A generic quantitative relationship between quality of experience and quality of service. *IEEE Network,* 24(2), pp. 36-41.

[11] ITU-T P.1401"Methods, metrics and procedures for statistical evaluation, qualification and comparison of objective quality prediction models". Available: https://www.itu.int/rec/T-REC-P.1401/en (2020).

[12] ITU-T P.1201: "Parametric non-intrusive assessment of audiovisual media streaming quality", October 2012.

[13]. ITU-T P.1202: "Parametric non-intrusive bitstream assessment of video media streaming quality", October 2012.

[14] ITU-T P.1203: "Parametric bitstream-based quality assessment of progressive download and adaptive audiovisual streaming services over reliable transport", March 2017.

[15] ITU-T P.1204: "Video quality assessment of streaming services over reliable transport for resolutions up to 4K", January 2020.

[16]. ITU-T P.863, Perceptual objective listening quality prediction, March 2018

[17] ITU-T P.565.1, Machine learning model for the assessment of transmission network impact on speech quality for mobile packet-switched voice services, November 2021.

[18] ITU-T G.1072, Opinion model predicting gaming quality of experience for cloud gaming services, January 2020.

What is claimed is:

1. A computer-implemented method for optimizing and/or troubleshooting a wireless network configured to support interactive over-the-top (OTT) service by estimating a user experience metric (UEM) of the interactive over-the-top (OTT) service using a network traffic client node and a network traffic server node, the method comprising:

(a) exchanging network packets between the client node and the server node during predetermined time windows, thereby forming packet trains having network traffic packet patterns;

(b) obtaining a number N≥2 network metrics based on the exchanged network packets during the predetermined time windows, the N network metrics including round-trip-time (rtt) and at least one of packet loss (pl), random jitter (rj) and spiky jitter (sj), where:

rtt and pl are measured network metrics;

rj is a statistic of variations in rtt; and sj is a statistic reflective of the largest variation of rtt;

(c) determining the user experience metric estimate (UEM) based on the obtained network metrics; and (d) in response to obtaining network metrics, dynamically adapting subsequent packet trains such that their network traffic packet patterns emulate network traffic packet patterns of the interactive over-the-top (OTT) service.

2. The method according to claim 1, wherein the server node, in response to information received from the client node, is configured to adjust a network traffic packet pattern of a subsequent packet train sent by the server node.

3. The method according to claim 2, wherein the client node, in response to information received from the server node, is configured to adjust a network traffic packet pattern of a subsequent packet train sent to the server node.

4. The method according to claim 1, comprising:

in step (d), dynamically adjusting the network traffic packet patterns of the packet trains by modifying the amount of network bits exchanged between the client node and the server node by changing: (i) the sizes of the network packets, and/or (ii) the amount of network packets.

5. The method according to claim 4, wherein the dynamic adaptation of the emulated interactive service network traffic packet pattern modifies the interval between the packets to be exchanged between the client node and the server node during a window of time.

6. The method according to claim 5, wherein:

the client node is provisioned with a first set of network traffic packet patterns;

the server node is provisioned with a second set of network traffic packet patterns, which is identical to the first set; and for each packet train exchanged between the client node and the server node:

the client node is configured to:

(i) for each of the downlink leg and the uplink leg, select a corresponding one of the plurality of network traffic packet patterns based on at least round-trip-time and packet loss, and/or statistics of the foregoing; and (ii) transmit to the server node, identifying information as to which network traffic packet pattern has been selected for the uplink leg of that packet train and which traffic pattern the server node is to use on the downlink leg; and the server node is configured to:

(i) use the network traffic packet pattern identified by the client node to select which traffic train to transmit to the client on the downlink leg; and (ii) transmit to the client node, the selected traffic train on the downlink leg.

7. The method according to claim 6, comprising:

pairing predefined sets of network traffic packet patterns to a predefined set of network condition profiles for exchanging the network packets between the client node and the server node, wherein:

each network traffic pattern is described by:

(a) sizes of each of the network packets of the packet train;

(b) the sending time, relative to the start of the packet train, of each of the network packets of the packet train; and (c) the total length of the packet train as a window of time;

each network condition profile comprises a particular set of ranges of values for each of the network metrics; and the identifying information transmitted to the server node by the client node identifies a particular one of the network condition profiles.

8. The method according to claim 1, wherein the dynamic adaptation of the emulated interactive service network traffic packet pattern modifies the interval between the packets to be exchanged between the client node and the server node during a window of time.

9. The method according to claim 1, wherein:

the client node is provisioned with a first set of network traffic packet patterns;

the server node is provisioned with a second set of network traffic packet patterns, which is identical to the first set; and for each packet train exchanged between the client node and the server node:

the client node is configured to:

(i) for each of the downlink leg and the uplink leg, select a corresponding one of the network traffic packet patterns based on at least round-trip-time and packet loss, and/or statistics of the foregoing; and (ii) transmit to the server node, identifying information as to which network traffic packet pattern has been selected for the uplink leg of that packet train and which traffic pattern the server node is to use on the downlink leg; and the server node is configured to:

(i) use the network traffic packet pattern identified by the client node to select which traffic train to transmit to the client node on the downlink leg; and (ii) transmit to the client node, the selected traffic train on the downlink leg.

10. The method according to claim 1, comprising:

pairing predefined sets of network traffic packet patterns to a predefined set of network condition profiles for exchanging the network packets between the client node and the server node, wherein:

each network traffic pattern is described by:

(a) sizes of each of the network packets of the packet train;

(b) the sending time, relative to the start of the packet train, of each of the network packets of the packet train; and (c) the total length of the packet train as a window of time;

each network condition profile comprises a particular set of ranges of values for each of the network metrics; and the identifying information transmitted to the server node by the client node identifies a particular one of the network condition profiles.

11. The method according to claim 1, comprising:

in step (c), determining the user experience metric (UEM) by calculating a product of N network metric functions, one network metric function for each of the obtained network metrics, each network metric function representing the effect of one or more of the obtained network metrics on the user experience.

12. The method according to claim 11, wherein one or more of the network metric functions are sigmoidal and are of the type $$F_{Matriic}(\text{metric}) = d_{Metric} + \frac{1 - d_{Metric}}{1 + \left(\frac{\text{metric}}{c_{Metric}}\right)^{b_{Metric}}}$$

where:

$b_{Metric}$ and $c_{Metric}$ and $d_{Metric}$ are coefficients derived from statistics of subjective scores of the user experience metric provided by users using the interactive over-the-top (OTT) service in a controlled environment.

13. The method according to claim 12, wherein one or more of the network metric functions are sigmoidal and of the type $$F_{Metric1}(\text{metric1}, \text{metric2}) = \frac{1}{1 + \left(\frac{\text{metric1}}{ca_{Metric1} + \frac{cb_{Metric1}}{2^{\frac{\text{metric2}}{cc_{Metric1}}}}}\right)^{\left(ba_{Metric1} + \frac{bb_{Metric1}}{2^{\frac{\text{metric2}}{bc_{Metric1}}}}\right)}}$$

where:

$ba_{Metric1}$, $bb_{Metric1}$, $bc_{Metric1}$, $ca_{Metric1}$, $cb_{Metric1}$ and $cc_{Metric1}$ are coefficients derived from statistics of subjective scores of the user experience metric provided by users using the interactive over-the-top (OTT) service in a controlled environment.

14. The method according to claim 13, comprising:

in step (b), measuring round-trip-time, packet loss, random jitter and spiky jitter;

in step (c), calculating the user experience metric (UEM) based on at least round-trip-time, packet loss, random jitter and spiky jitter.

15. The method according to claim 14, comprising:

in step (c), calculating the user experience metric (UEM) using the following formula:

$$UEM(rtt, pl, stdev_{rj}, spikesize_{sj}) = F_{RTT}(rtt) * F_{PL}(pl, rtt) * F_{RJ}(stdev_{rj}) * F_{SJ}(spikesize_{sj}),$$

where:

$F_{RTT}$(rtt) is a first sigmoidal function having rtt as an input;

$F_{PL}$(pl, rtt) is a second sigmoidal function having pl and rtt as inputs;

$F_{RJ}(stdev_{rj})$ is a third sigmoidal function having $stdev_{rj}$ as an input;

$F_{SJ}(spikesize_{sj})$ is a fourth sigmoidal function having $spikesize_{sj}$ as an input;

$stdev_{rj}$ is a statistic of measured random jitter over the predetermined time window;

$spikesize_{sj}$ is a statistic of measured jitter spikes over the predetermined time window.

16. The method according to claim 15, wherein $$F_{RTT}(rtt) = \frac{1}{1 + \left(\frac{rtt}{c_{RTT}}\right)^{b_{RTT}}}$$

where:

$b_{RTT}$ and $c_{RTT}$ are coefficients derived from statistics of subjective scores of the user experience metric provided by users using the interactive over-the-top (OTT) service in a controlled environment.

17. The method according to claim 16, where $$F_{PL}(pl, rtt) = \frac{1}{1 + \left(\frac{pl}{ca_{PL} + \frac{cb_{PL}}{2^{\frac{rtt}{cc_{PL}}}}}\right)^{\left(ba_{PL} + \frac{bb_{PL}}{2^{\frac{rtt}{bc_{PL}}}}\right)}}$$

where:

$ba_{PL}$, $bb_{PL}$, $bc_{PL}$, $ca_{PL}$, $cb_{PL}$ and $cc_{PL}$ are coefficients derived from statistics of subjective scores of the user experience metric provided by users using the interactive over-the-top (OTT) service in a controlled environment.

18. The method according to claim 17, wherein $$F_{RJ}(stdev_{rj}) = d_{RJ} + \frac{1 - d_{RJ}}{1 + \left(\frac{stdev_{rj}}{c_{RJ}}\right)^{b_{RJ}}}$$

where:

$b_{Rj}$, $c_{Rj}$ and $d_{Rj}$ are coefficients derived from statistics of subjective scores of the user experience metric provided by users using the interactive over-the-top (OTT) service in a controlled environment.

19. The method according to claim 18, wherein $$F_{SJ}(spikesize_{sj}) = \frac{1}{1 + \left(\frac{spikesize_{sh}}{c_{SJ}}\right)^{b_{SJ}}}$$

where:

$b_{Sj}$ and $c_{Sj}$ are coefficients derived from statistics of subjective scores of the user experience metric provided by users using the interactive over-the-top (OTT) service in a controlled environment.

20. The method according to claim 19, wherein the coefficients for the UEM functions fall within the following ranges:

| Function | Coefficient ranges |
|---|---|
| $F_{RTT}$(rtt) | $b_{RTT}$ = 2.50 +/− 0.35<br>$c_{RTT}$ = 200 +/− 12 |
| $F_{RJ}(stdev_{rj})$ | $b_{RJ}$ = 120 +/− 3<br>$c_{RJ}$ = 7.4 +/− 2<br>$d_{RJ}$ = 0.45 +/− 0.1 |
| $F_{SJ}(spikesize_{sj})$ | $b_{SJ}$ = 1.1 +/− 0.3<br>$c_{SJ}$ = 503 +/− 198 |
| $F_{PL}$(pl, rtt) | $ba_{PL}$ = 0.65 +/− 0.3<br>$bb_{PL}$ = 9.0 +/−0.5<br>$bc_{PL}$ = 14.8 +/−2.1<br>$ca_{PL}$ = 0.22 +/−0.35<br>$cb_{PL}$ = 31.6 +/− 0.6<br>$cc_{PL}$ = 12.3 +/− 0.7. |

21. The method according to claim 20, wherein:

the obtained network metrics include all four of round-trip-time, packet loss, random jitter and spiky jitter;

the user experience metric estimate corresponds to a Quality of Experience (QoE) based on a mean opinion score (MOS) measured on an Absolute Category Rating (ACR) of 1 to 5; and the user experience metric is defined as:

$$UEM(rtt, pl, stdev_{rj}, spikesize_{sj}) = 1 + 4 * F_{RTT}(rtt) * F_{PL}(pl, rtt) * F_{RJ}(stdev_{rj}) * F_{SJ}(spikesize_{sj}).$$

22. The method according to claim 1, comprising:

in step (b), measuring round-trip-time, packet loss, random jitter and spiky jitter;

in step (c), calculating the user experience metric (UEM) based on at least round-trip-time, packet loss, random jitter and spiky jitter.

23. The method according to claim 22, comprising:

in step (c), calculating the user experience metric (UEM) using the following formula:

$$UEM(rtt, pl, stdev_{rj}, spikesize_{sj}) = F_{RTT}(rtt) * F_{PL}(pl, rtt) * F_{RJ}(stdev_{rj}) * F_{SJ}(spikesize_{sj}),$$

where:

$F_{RTT}$(rtt) is a first sigmoidal function having rtt as an input;

$F_{PL}$(pl, rtt) is a second sigmoidal function having pl and rtt as inputs;

$F_{RJ}(stdev_{rj})$ is a third sigmoidal function having $stdev_{nj}$ as an input;

$F_{SJ}(spikesize_{sj})$ is a fourth sigmoidal function having $spikesize_{sj}$ as an input;

$stdev_{nj}$ is a statistic of measured random jitter over the predetermined time window;

$spikesize_{sj}$ is a statistic of measured jitter spikes over the predetermined time window.

24. The method according to claim 23, wherein $$F_{RTT}(rtt) = \frac{1}{1 + \left(\frac{rtt}{c_{RTT}}\right)^{b_{RTT}}}$$

where:

$b_{RTT}$ and $c_{RTT}$ are coefficients derived from statistics of subjective scores of the user experience metric provided by users using the interactive over-the-top (OTT) service in a controlled environment.

25. The method according to claim 23, where $$F_{PL}(pl, rtt) = \frac{1}{1 + \left(\frac{pl}{ca_{PL} + \frac{cb_{PL}}{2^{\frac{rtt}{cc_{PL}}}}}\right)^{\left(ba_{PL} + \frac{bb_{PL}}{2^{\frac{rtt}{bc_{PL}}}}\right)}}$$

where:

$ba_{PL}$, $bb_{PL}$, $bc_{PL}$, $ca_{PL}$, $cb_{PL}$ and $cc_{PL}$ are coefficients derived from statistics of subjective scores of the user experience metric provided by users using the interactive over-the-top (OTT) service in a controlled environment.

26. The method according to claim 23, wherein $$F_{RJ}(stdev_{rj}) = d_{RJ} + \frac{1 - d_{RJ}}{1 + \left(\frac{stdev_{rj}}{c_{RJ}}\right)^{b_{RJ}}}$$

where:

$b_{Rj}$, $c_{Rj}$ and $d_{Rj}$ are coefficients derived from statistics of subjective scores of the user experience metric provided by users using the interactive over-the-top (OTT) service in a controlled environment.

27. The method according to claim 23, wherein $$F_{SJ}(spikesize_{sj}) = \frac{1}{1 + \left(\frac{spikesize_{sj}}{c_{SJ}}\right)^{b_{SJ}}}$$

where:

$b_{Sj}$ and $c_{Sj}$ are coefficients derived from statistics of subjective scores of the user experience metric provided by users using the interactive over-the-top (OTT) service in a controlled environment.

28. The method according to claim 23, wherein:

the obtained network metrics include all four of round-trip-time, packet loss, random jitter and spiky jitter;

the user experience metric estimate corresponds to a Quality of Experience (QoE) based on a mean opinion score (MOS) measured on an Absolute Category Rating (ACR) of 1 to 5; and the user experience metric is defined as:

$$UEM(rtt, pl, stdev_{rj}, spikesize_{sj}) = 1 + 4 * F_{RTT}(rtt) * F_{PL}(pl, rtt) * F_{RJ}(stdev_{rj}) * F_{SJ}(spikesize_{sj}).$$

29. A system configured to implement the method of claim 1, comprising:

a memory; and a processing device, operatively coupled to memory, and configured to execute a software tool deployed on two network nodes, called emulating client and emulating server, respectively; and when executed, cause an IP-based network communication between two network nodes to:

(i) emulate the network traffic packet pattern of an interactive service wherein the network traffic packet pattern describes the number of network packets to be exchanged, the transmission time of each network packet, and the size of each network packet, within a predetermined time window;

(ii) obtain network metrics during the emulation of the interactive service between the emulating client and the emulating server, wherein the obtained network metrics include at least round-trip-time (rtt), and at least one of packet loss (pl), random jitter (rj) and spiky jitter (sj);

(iii) dynamically adapt the emulated network traffic packet pattern based on the obtained network metrics wherein the adaptation changes the number of packets to be exchanged, the transmission time of each network packet, and the size of each network packet, within a predetermined time window; and (iv) predict a user experience score of the emulated interactive service.

* * * * *